United States Patent
Funamoto et al.

[11] Patent Number: 5,884,832
[45] Date of Patent: Mar. 23, 1999

[54] METHOD OF BONDING METAL PLATES, APPARATUS THEREFOR AND HOT STRIP MILL

[75] Inventors: Takao Funamoto, Hitachi; Gen Nagakubo, Kitaibaraki; Takashi Mashiko, Hitachi; Fuminori Ishikawa, Hitachiota; Tadashi Nishino; Yusutsugu Yoshimura, both of Hitachi; Toshiyuki Kajiwara, Tokyo; Kenichi Yasuda, Hitachinaka; Mitsuo Nihei, Hitachi; Yoshio Takakura, Hitachi; Hironori Shimogama, Hitachi, all of Japan

[73] Assignee: Hitachi, Ltd., Tokyo, Japan

[21] Appl. No.: 736,208

[22] Filed: Oct. 25, 1996

[30] Foreign Application Priority Data

Oct. 27, 1995 [JP] Japan .................................. 7-280116

[51] Int. Cl.⁶ .......................... B21B 15/00; B23K 20/02
[52] U.S. Cl. .......................... 228/13; 228/15.1; 228/49.4
[58] Field of Search .................................. 228/158, 171, 228/15.1, 13, 44.3, 49.4

[56] References Cited

U.S. PATENT DOCUMENTS

| | | | |
|---|---|---|---|
| 4,294,394 | 10/1981 | Iida et al. ................................. | 228/158 |
| 4,706,871 | 11/1987 | Kajiwara et al. ........................ | 228/158 |
| 5,292,052 | 3/1994 | Ito et al. ................................... | 228/158 |
| 5,720,425 | 2/1998 | Tazoe et al. ............................. | 228/171 |

OTHER PUBLICATIONS

Patent Abstracts of Japan, vol. 016, No. 507 (M–1327), 20 Oct. 1992 & JP 04 187386 A (Ishikawajima Harima Heavy Ind Co Ltd), 6 Jul. 1992 *Abstract; Figures*.
Patent Abstracts of Japan, vol. 095, No. 010, 30 Nov. 1995 & JP 07 178416 A (Sumitomo Metal Ind Ltd), 18 Jul. 1995 *Abstract; Figures*.
Patent Abstracts of Japan, vol. 011, No. 155 (M–589), 20 May 1987 & JP 61 286004 A (Mitsubishi Heavy Ind Ltd), 16 Dec. 1986 *Abstract*.
Patent Abstracts of Japan, vol. 018, No. 611 (M–1708), 21 Nov. 1994 & JP 06 234005 A (Kawasaki Steel Corp), 23 Aug. 1994 *Abstract; Figures*.
Patent Abstracts of Japan, vol. 018, No. 254 (M–1605), 16 May 1994 & JP 06 039405 A (Kawasaki Steel Corp), 15 Feb. 1994 *Abstract; Figures*.
Patent Abstracts of Japan, vol. 010, No. 342 (M–536), 19 Nov. 1986 & JP 61 144285 A (Ishikawajima Harima Heavy Ind Co Ltd), 1 Jul. 1986 *Abstract; Figures*.
Patent Abstracts of Japan, vol. 010, No. 286 (M–521), 27 Sep. 1986 & JP 61 103607 A (Sumitomo Metal Ind Ltd), 22 May 1986 *Abstract; Figures*.
Patent Abstracts of Japan, vol. 011, No. 296, (M–627), 25 Sep. 1987 & JP 62 089503 A (Sumitomo Metal Ind Ltd), 24 Apr. 1997 *Abstract; Figures*.

*Primary Examiner*—Samuel M. Heinrich
*Attorney, Agent, or Firm*—Antonelli, Terry, Stout & Kraus, LLP

[57] ABSTRACT

A bonding apparatus for bonding metal plates, includes an overlapping mechanism for overlapping end portions of the metal plates, at least two supports for supporting the overlapped portion of the metal plates at one side of the metal plates, and a shearing blade disposed opposite the supports so as to sandwich the overlapped portion of the metal plates therebetween, wherein a mechanism is provided for moving relatively moving at least one of the shearing blade and the supports so as to press the shearing blade into the overlapped portion of the metal plates disposed between the supports and the shearing blade. A method for bonding is characterized by bonding metal plates by using the above apparatus.

19 Claims, 23 Drawing Sheets

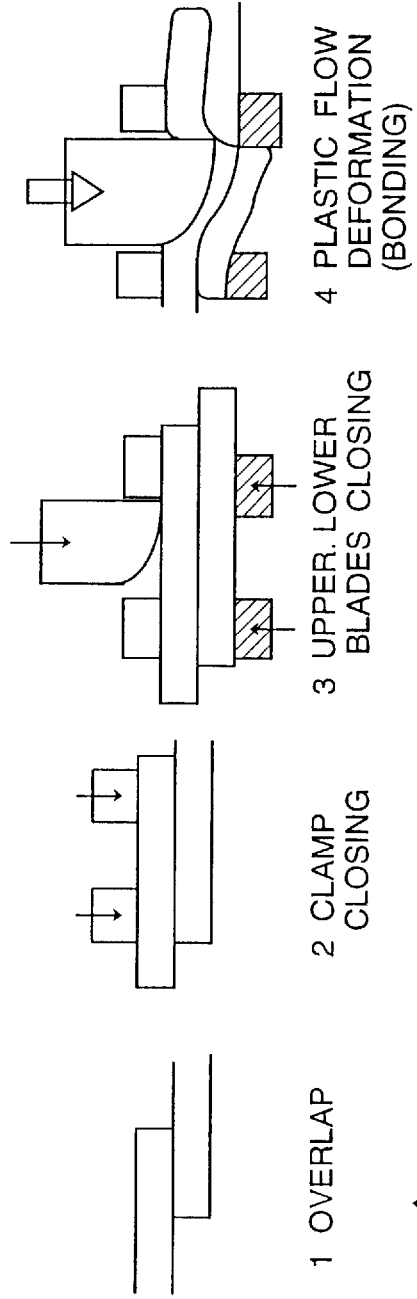

FIG. 10

| PRESSING RATE \ BAR TEMP. | (°C) | | | |
|---|---|---|---|---|
| | 600 | 800 | 1000 | 1200 |
| 0.8 (m/s) | ● | ○ | ○ | ○ |
| 0.7 | ● | ○ | ○ | ○ |
| 0.6 | ● | ○ | ○ | ○ |
| 0.5 | ● | ○ | ○ | ○ |
| 0.4 | ● | ● | ○ | ○ |
| 0.3 | ● | ● | ● | ● |
| 0.2 | ● | ● | ● | ● |

BAR : SS400

○ : 60% OR MORE MELTING

● : MELTING LESS THAN 60%, OR NON-MELTING

FIG. 11(a)
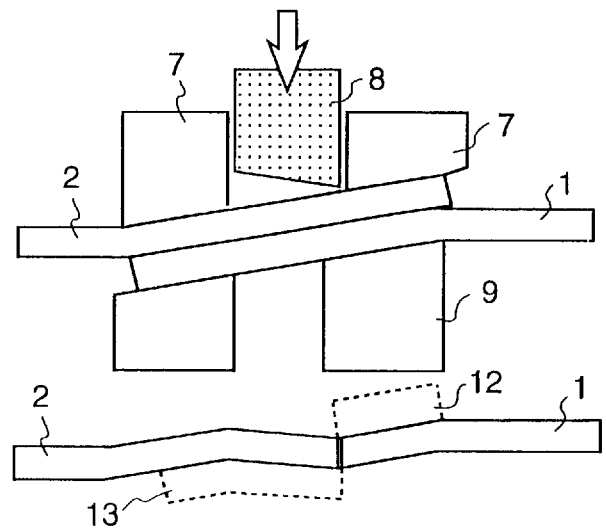
FIG. 11(b)
FIG. 12(a)
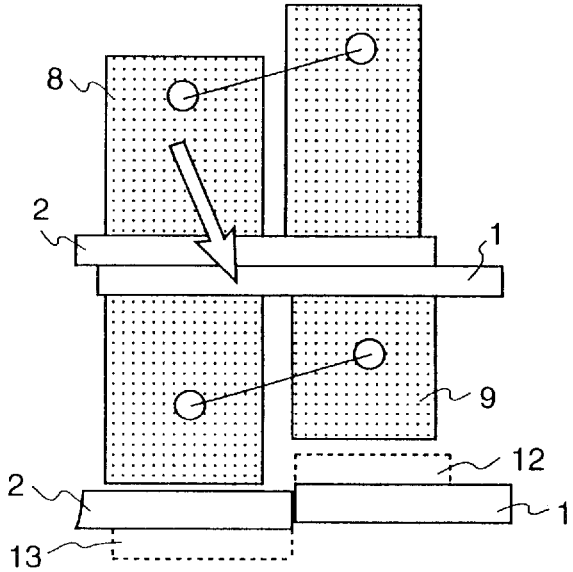
FIG. 12(b)

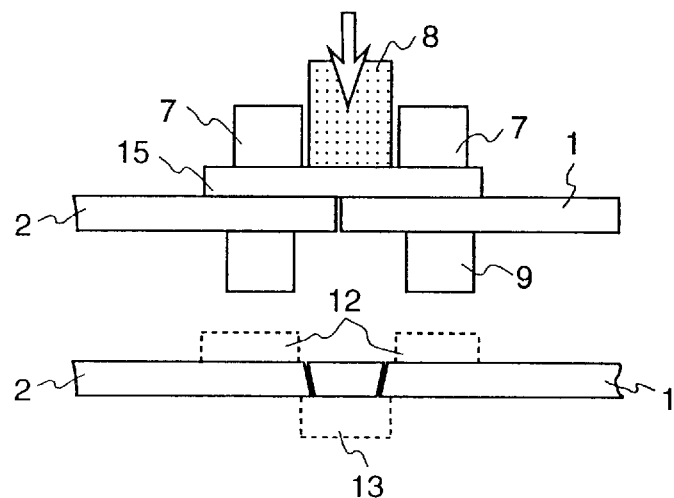
FIG. 13(a)
FIG. 13(b)
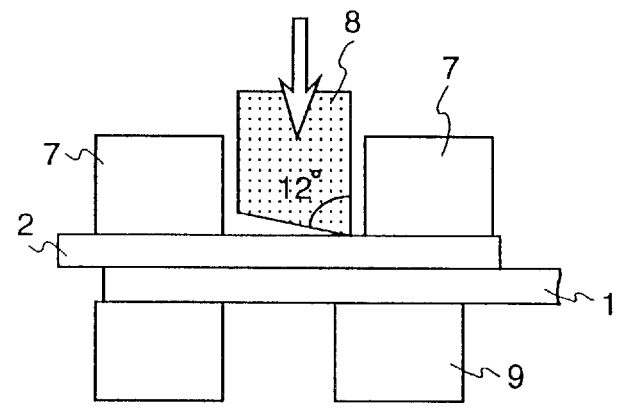
FIG. 14(a)
FIG. 14(b)

← PLATE WIDTH DIRECTION →

DESCALING OF PRECEDING BAR

DESCALING OF FOLLOWING BAR

OVERLAP

HEATING

BONDING, SET OF BLADES

BONDING COMPLETION

CROP SEPARATION

FINISHI ROLLING

FIG. 31(a)
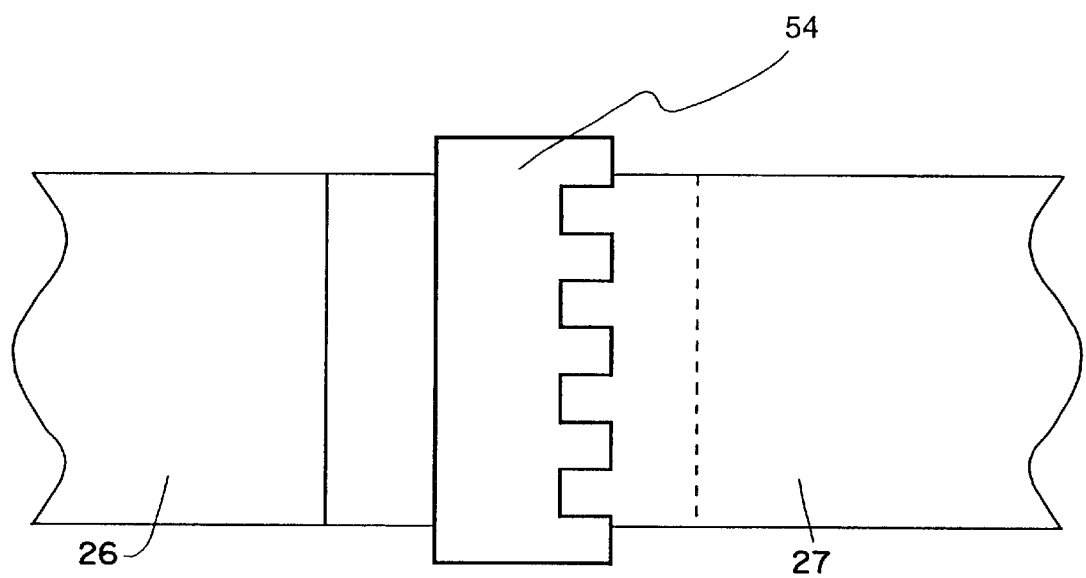
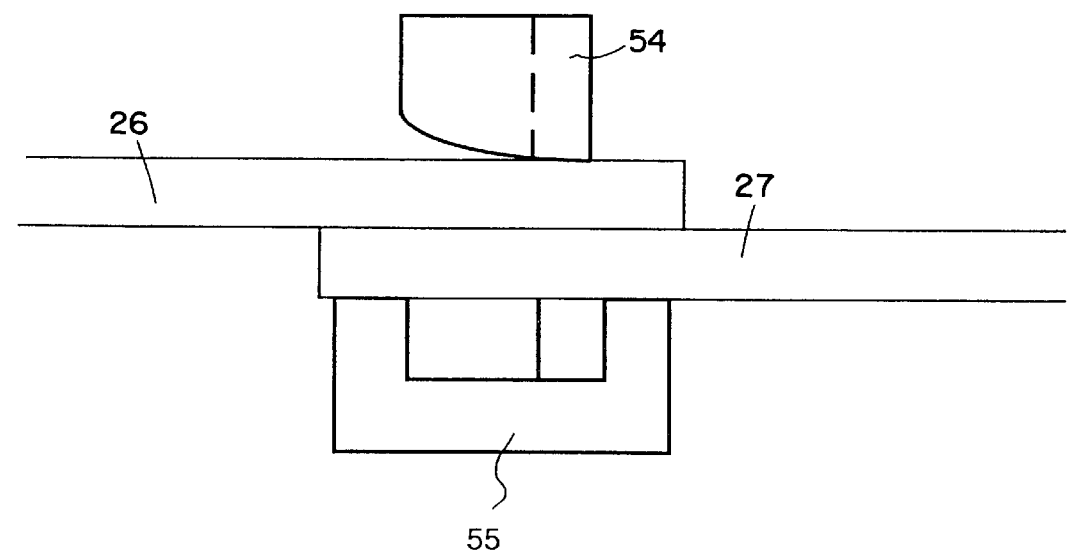
FIG. 31(b)

FIG. 32(a)
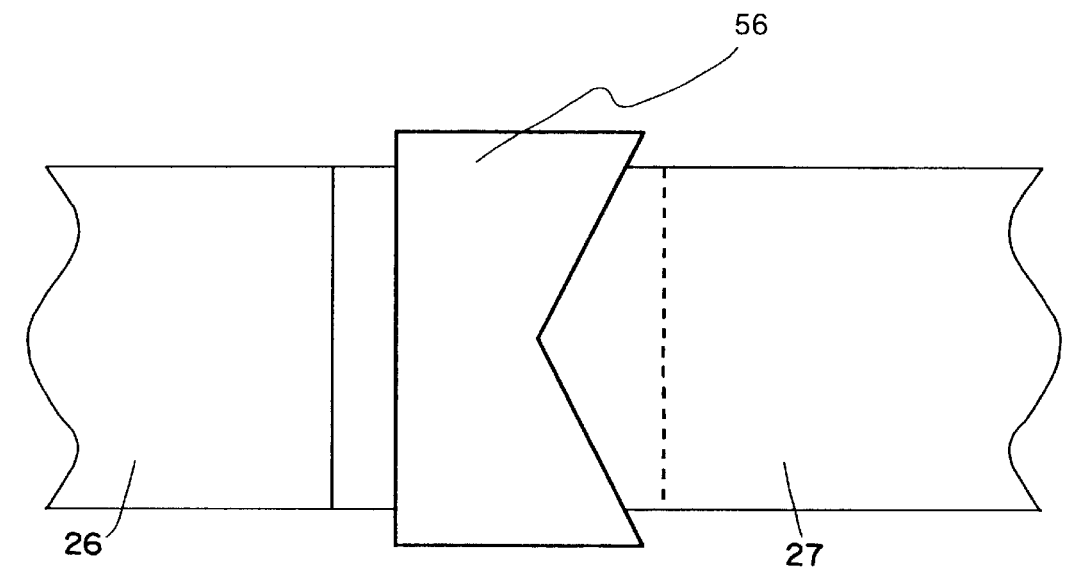
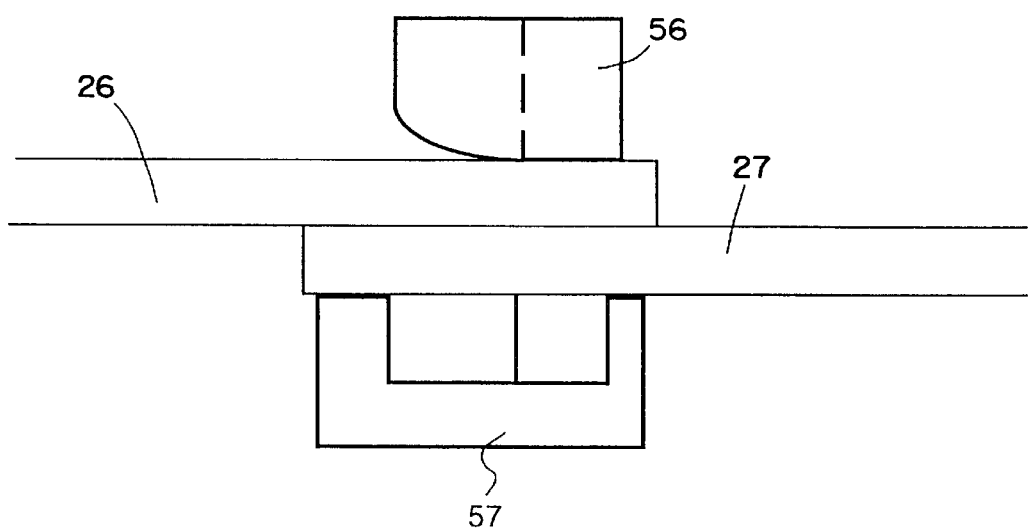
FIG. 32(b)

METHOD OF BONDING METAL PLATES, APPARATUS THEREFOR AND HOT STRIP MILL

BACKGROUND OF THE INVENTION

The present invention relates to a method of bonding metal plates and, more particularly, to a method of bonding hot rolled plates which makes it possible to perform continuous rolling by bonding the hot rolled plates in a short time when the hot rolled plates are rolled by a set of coarse rolling mills and a set of finish rolling mills.

There has been a strong needs to improve the productivity and the quality in the manufactured metal plates and to realize automatic operation in a hot rolling facility, by continuously performing finish rolling. The key technology is in the bonding of hot rolled plates (hereinafter, referred to as "sheet bars"). In the case of cold rolling plate, it is possible to bond the plates and perform continuous rolling because the rolled plates are thin and the strength of the bonding is sufficient. However, in the case of sheet bars, it is difficult to bond the bars by welding because the sheet bars are thick and the rolling speed (transferring speed of the rolled plate) is faster than that in a cold rolling mill, since the rolling must be finished before the temperature of the bars decreases.

In the past there have been many proposed methods of bonding sheet bars, such as an electric heating method, a gas heating method, a melt-chopping method and a friction method. However, these methods still have not proven to be satisfactory. The most important reason why they are not satisfactory is that it takes a long time to bond the sheet bars. In a running type bonding apparatus, where the bonding apparatus moves with the bars, if the bonding of sheet bars can not be performed in a short time, the running length of the bonding apparatus becomes excessive, since the rolling speed of bar is fast, as described above. Therefore, it is difficult to realize such a machine. On the other hand, in a case where the bonding apparatus is of the fixed type, a huge looper for accumulating bars is required, since the thickness of the sheet bar is generally as much as 20 to 50 mm. In the past, it took 20 to 30 seconds at a minimum to bond sheet bars, including the preparation for the bonding, the removal of roll-over and burrs caused by pressing, etc. Technologies for shortening the bonding time of bars are disclosed in Japanese Patent Application Laid-Open No. 4-187386 and Japanese Patent Application Laid-Open No. 6-39405.

In these technologies, strong metallurgical bonding can be obtained in such a manner that the end portions of a preceding rolled plate and the following rolled plate are cut and rubbed at the same time, and are butted against each other if necessary, to bring clean surfaces of the rolled plates into direct contact with each other without the intervention of the oxide films on the surfaces of the hot rolled plates.

As a method of completing bonding in a short time, there is a push back blanking method, for example, which is disclosed in fiscal Heisei 6 (fiscal 1994) Plastic Working Spring Season Proceedings, page 455. This is a method wherein materials to be bonded are overlapped on each other, held by a die and stripper, and then pressed in by a punch, whereby the materials are bonded. According to this method, the sheared surfaces of the materials are bonded in an instant, so that a high bonding strength can be attained.

From a series of tests in which the above technologies, as disclosed in JP A 4-187386 and JP A 6-39405, were applied to various kinds of materials of hot rolled plates having various thicknesses, the inventors of the present invention found that when the rolled plates were made of carbon steel or stainless steel and the thickness was large, the bonding strength was insufficient and a break sometimes occurred in the bonded portion during rolling. A break in a rolled plate during rolling scratches the surface of the roll, causing the whole process line to be stopped, which substantially decreases production efficiency.

Further, the push back blanking method is an application of blanking, using a punch and a die, and can not be used for bonding of metal plates, which are the objects to be bonded by the present invention, in particular, for bars each having a thickness of several tens of mm.

SUMMARY OF THE INVENTION

An object of the present invention is to eliminate the disadvantages in the conventional technologies described above, and to provide a method of bonding metal plates, particularly, hot rolled plates, which is capable of bonding the metal plates with a sufficient bonding strength within a short time.

In order to achieve the above-mentioned object, according to the present invention, there is provided a bonding apparatus for bonding metal plates, comprising an overlapping mechanism for overlapping portions to be bonded on the metal plates, at least two supports for supporting the overlapping portions of the metal plates at one side of the metal plates, and a shearing blade disposed at a position opposite the supports so as to sandwich the overlapping portions of the metal plates, and wherein a moving mechanism is provided for moving the shearing blade or the supports so as to shear the overlapping portions of the metal plates between the supports and the shearing blade.

As an overlapping mechanism for overlapping portions to be bonded, various mechanisms can be employed, for example, a mechanism for overlapping metal plates in the vicinity of a shearing blade by moving a stage supporting one of the metal plates up and down with power, such as hydraulic power, pneumatic power, motor power, etc. Another is a mechanism in which roller supports are provided for transferring metal plates to be bonded, having a different height around the bonding apparatus, so that the metal plates are naturally overlapped when they reach the bonding position. Any mechanism is sufficient which will cause the metal plates to overlap at the bonding apparatus.

As for the supports for supporting overlapping portions of metal plates at a lower side, usually, the overlapping portions are supported in such a direction that the weight applied to the metal plates is supported, that is, it is supported at the lower side. However, when the metal plates are made of magnetic material, they can be supported by a magnetic force at an upper side, or they can be supported at a lateral side by standing them in the vertical direction. The support can have a cubic shape, triangle-columnar shape, circle-columnar shape, and any support can be used as long as the shape of the support does not change when the shearing blade is pressed in the metal plate.

According to the above construction of the bonding apparatus, it is possible to perform sufficiently strong bonding of metal plates in a short time. In particular, it is possible to provide a bonding apparatus which is suitable for bonding rolling material (referred to as sheet bar), which apparatus is positioned between roughing and finishing hot strip mills and so as to accommodate a difference in rolling speed between the two kind of mills.

In a first aspect of the present invention, it is preferable that an extension line of an operating locus of the shearing blade crosses one of the lower supports. That an extension line of an operating locus of the shearing blade crosses one of the lower supports means that, in a case where the shearing blade is movable on an imaginary straight line, for example, the shearing blade hits the support when the blade is moved toward and over the plates to be bonded. In other words, this means that there is a part of the plates in the bonding which is sandwiched between the shearing blade and the support and is pressed therebetween. When the shearing blade moves along a curved operating locus, the movable shearing blade and/or the support is arranged so that an extension line of the locus crosses the support. By such an arrangement of the movable shearing blade and the support, the plates to be bonded are compressed and elongated in a direction perpendicular to the compression direction during the compression, whereby clean surfaces of the plates to be bonded are pressed against each other and the bonding strength can be raised.

In accordance with this first aspect of the invention, it is preferable for the shearing blade to have such a shape that a lower edge portion of the shearing blade closer to one of the lower supports which the above-mentioned operating locus crosses is closer to an overlapping portion of the plates to be bonded than another lower edge portion which is closer to the other support. For example, the section of the shearing blade has an approximately arcuate shape when viewed from a side of the plate to be bonded, as seen in FIG. 3.

By such a construction of the shearing blade, the bending angle of the plates to be bonded becomes small, and it is easy to flatten the bonded portion after bonding. Further, even a small power is sufficient for driving the shearing blade or supports.

In the first aspect of the invention, it is preferable that the shearing blade moves in a relatively straight line with respect to the supports and that the shearing blade and one support overlap by a predetermined amount when viewed along the straight operating locus line. This means that the extension line of the operating locus of the shearing blade crosses one of the lower supports and the shearing blade moves in a straight line. Since the shearing blade moves in a straight line, the apparatus has an effect that the construction thereof becomes simple.

In accordance with the invention, the length of the overlap between the support and the shearing blade is preferably 10 mm or less when measured along the length direction of the plate to be bonded.

Even if there is no overlap, a certain strength of bonding can be attained. In particular, although there is no problem in a case of aluminum material, which is soft, when plates to be bonded are thick, provision of the above-mentioned can increase the bonding strength.

In the first aspect of the invention, the stroke of the movable shearing blade after contact with the upper surface of the plates to be bonded is preferably 50% or more and 150% or less than the maximum thickness of the overlapping metal plates.

In accordance with the present invention, it is preferable to bond the metal plates by deforming the metal plates without shearing the metal plates. A lot of energy is required for moving the shearing blade or supports until the plate is completely sheared. Therefore, the stroke of the shearing blade, relative to the metal plate, is preferably 50% or more and 150% or less than the thickness of a metal plate. By this construction, it is possible to provide a bonding apparatus which can effect a bonding of high strength with a small consumption of energy.

In accordance with the first aspect of the invention, there can be provided equipment by which the bonding apparatus is movable on a rail. For a bonding apparatus arranged between roughing and finishing strip mills, by constructing the bonding apparatus so as to complete bonding while moving in synchronism with the feeding speed of a hot strip being rolled, it is unnecessary to provide a so-called looper which adjusts the feeding speed by deforming the strip being rolled. That is, the construction of the continuous rolling equipment becomes simple.

In the first aspect of the invention, the supports can be constructed to be one piece or they can be joined pieces providing a concave shape. This construction makes the bonding apparatus simple and reduces the cost of the apparatus.

In accordance with the first aspect of the invention, it is preferable that the metal plate is hot rolling plate (sheet bar). The temperature of the metal plate to be joined is preferably made higher in order to effect easy deformation of the plate. As a result, the energy required for bonding becomes lower and the bonding strength becomes higher. In the case of bonding cold rolling plates, heating before bonding can be used. In the case of hot strips being bonded, a heater is unnecessary and the construction can be made simple.

In the first aspect of the invention, the section of the shearing blade pressed into the metal plate, when viewed from the side in the length direction of the plate, is polygonal, such as a trapezoidal shape, the contact area of the shearing blade with the plate changes continuously, and the angle of the portion of the shearing blade first contacting the plate with respect to the plate can be about 0°. This shape can be straight or arcuate. In a case of an arcuate shape, the tangential angle at a point in contact with the plate is made to be 0°. Further, the angle of the portion of the shearing blade first contacting the plate in a direction perpendicular to the surface of the plate influences the life of the shearing blade in operation, so that it is desirable for it to be 90° or more. Further, it is desirable to form the shearing blade shape so that the trailing edge of the shearing blade is pressed into the overlapping portion of the sheet bars at a time when the pressing of the shearing blade is completed. By forming the shearing blade in this shape, the portion of the lower plate, in alignment with the trailing edge of the shearing blade, bites into the concave part of the supports, and so it is possible to cause a large pressing pressure in the bonding area.

The shape of the concave part of the supports influences greatly the bonding strength. The shape of the supports corresponding to a portion at which the shearing blade first contacts the sheet bar is sufficient if it extends along the operating locus of the shearing blade, but is more preferable if it has a shape such that the supports cross an extension line of the operating locus. For example, when the operating locus of the shearing blade is a straight line perpendicular to the sheet bar, it is preferable for it to be an oblique shape, not perpendicular, but inclined, that is, 90° or less, in an edge angle of an upper portion of the supports corresponding to a portion at which the shearing blade first contacts the sheet bar, and larger in a bar length-wise distance between the supports of the concave portion as the depth of the concave portion increases. By this construction, all of the overlapped portion of the lower bar, deformed in a case where the shearing blade is pressed in, is self-locked and supported by the concave portion, whereby a large pressing pressure in the bonding area can be realized when the sheet bars are bonded. Further, it is desirable to form the support corresponding to a portion at which the shearing blade finally contacts the bar so that it has a shape that bites into the lower bar at the time of completion of the pressing, as mentioned above. Usually, it is sufficient if the support has a shape along the operating locus of the shearing blade, but it more preferably has a shape that protrudes toward the direction of the shearing blade.

Further, the conditions of operation of the shearing blade will be described hereunder. In this bonding method, the speed of pressing the shearing blade into the sheet bar greatly influences the bonding strength. When the speed is low, scales are unlikely to be separated, but are deformed together with the sheet bar, and the scales are likely to be spread widely in the bonded surfaces and to be left therein after the bonding. Therefore, high speed is preferable. In this regard, 5 mm/s or more is preferable, and 50 mm/s or more is even more preferable.

The bonding surface of the sheet bar according to the bonding method of the present invention extends in a longitudinal direction of the sheet bar at the time of starting of the bonding, that is, immediately before the shearing blade presses down, the bonding area corresponding to the area of the overlapping sheet bar. As the shearing blade moves down, the bonding surface is pressed in by the shearing blade so as to be deformed and finally it extends in an oblique direction inclined with respect to the thickness direction of the shearing bar. The angle changes according to the bonding conditions, such as the amount of overlap of the shearing blade and the support, the stroke of the pressing in movement, etc., and this angle influences the rolling process after the bonding. The larger the angle is, that is, as the bonding surface becomes more oblique, the more the bonding area can be prevented from breaking during rolling and be stably processed.

As one of the methods of securing a higher strength in the bonding area at the time of rolling, there is a method of enlarging the bonding area. In order to accomplish this, the sectional shape of the shearing blade and support when viewed from above the sheet bar, that is, the shape in the width direction of the sheet bar, is made to have a non-linear shape. In a case where the shape is that of a triangle of 90°, for example, the bonding area becomes 1.4 times as compared with the case of a straight line; when the angle of the triangle is 60°, the bonding area becomes 2 times as compared with the case of straight line; when the form is shaped in a semi-circular shape, it is 1.57 times; and when the form has a rectangular shape, the bonding area can be increased by an amount corresponding to the sum (increased length) of the depth of the concave and convex portions thereof. In this case, when the bonding area is shortened in the longitudinal direction of the sheet bar, the depth of the concave and convex portions is made smaller and the number of waves is increased.

Since sheet bars usually have a width of 1000 mm or more, when the sheet bar is rolled, in particular the trailing end becomes larger in elongation at the center. Therefore, it is likely that the bonding area will be cracked at the side edges when it is rolled. In order to prevent this cracking, it is desirable to form a bonding area at both side ends which protrudes or extends toward the downstream direction of the moving sheet bar more than the bonding area at the center. That is, it is desirable for the shape of the shearing blade and support, when viewed from above in the longitudinal direction of the sheet bar, to be like a V shape in which both lateral ends of the shearing blade and support protrude toward the downstream moving direction of the sheet bar. As a specific shape, an inverse triangle extending in a downstream direction, a semi-circle, or an ellipse can be selected as needed. Also, by superimposing the above-mentioned wave form on the V shape, the effect of increasing the bonding area increases and a stable operation of high reliability can be performed.

In bonding sheet bars, it is an object to bond the trailing end of a preceding bar and the leading end of the following bar thereby to smoothly effect a finish rolling in a subsequent process, so that it is necessary to remove unwanted overlapping portions of the sheet bar (hereunder, referred to as crop) remaining in the bonded area. The easiness of such removal depends on the shape of the shearing blade and support. Further, the bonding conditions, such as the amount overlap between the shearing blade and the support, the amount of the pressing stroke, etc., in particular, the amount of the pressing stroke, has a great influence thereon.

As mentioned above, the bonded area according to the present bonding method has a shape inclined with respect to the thickness direction at a certain angle. After the crop is cut off, however, a connection between the crop and the bonded sheet bar may be left according to the extent of the pressing stroke. As a method of separating the crop, a proper method can be adopted, such as a method of pressing the crop in the direction of the sheet bar length or width, and a method of separating the crop using a tool, such as craw, etc.; however, in order to make it easy to separate the crop, it is preferable to control the bonding condition so that a connection remaining part between the bonded sheet bar and the crop is 5 mm or less in the thickness direction. From this standpoint, the pressing stroke should be at least equal to the bar thickness or more, and is preferably, 1.2 times the bar thickness or more. When the pressing stroke is 1.2 times the bar thickness or more, the thickness of the remaining connection becomes small and, at the same time, a plastic deformation of the bonding portion becomes large, so that the bonding strength also increases. Further, when only the bonding portion is descaled without descaling the other overlapping portions of the sheet bar, it is suitable for the crop separation because the crop separation force becomes small. On the contrary, in order to increase the separability of the crop, it is possible to coat an inert material, such as ceramic powder, on the overlapping sheet bar surface, except for the bonding area, before bonding. In this case, it may be necessary to remove the coated material from the bonded sheet bar after crop separation.

Some steps are needed for crop removing, in particular, when sheet bars having a different thickness or different width are bonded. In a case where sheet bars of different thickness are bonded, the pressing stroke is set so as to be suitable for the thicker one of the metal plates. By this setting, the crop of the thinner sheet bar is in a state where the sheet bar is cut at the bonding, since almost no remaining portion of the connection is left. Crop separation is enhanced by providing a controller which can automatically adjust the pressing stroke by detecting the thickness of the sheet bars to be bonded. In a case where plates of different width are bonded, it is necessary to use a method of cutting the sheet bar so that the width of the plates are the same as each other in a process prior to the completion of the bonding after overlapping, or a method wherein a shearing blade or support is divided into plural parts, the blade section extending out of the plate width having a pressing stroke which is increased by a stroke amount corresponding to the thickness in advance of bonding, etc.

As mentioned above, in the bonding method of the present invention, bonding is performed while maintaining cleanness through crushing of scale on the metal plate surface, however, the crushed scale disperses in the bonded surface and a substantial bonding area decreases. In order to secure high reliability by raising the bonding strength and increasing the success probability of bonding, it is desirable to perform descaling of the surfaces of the metal plates to be bonded before overlapping them. As a descaling method, there are various methods, such as mechanical grinding using a rotating cutter, mechanical broaching, etc. jetting high pressure water, and combustion gas jetting from an acetylene gas burner, etc. It is preferable to select and use a method which is effective in a short time. Here, descaling is not necessarily performed on all of the overlapping surfaces. As mentioned above, it is preferable to perform descaling in a limited region where the plate is deformed to form a bonding surface. Concretely, it is most preferable to effect descaling in a region of 10–30 mm in a longitudinal direction.

The present bonding method is principally a solid phase bonding method and utilizes plastic deformation. For the bonding, the temperature, cleanness and pressing pressure on the bonding surface are important. As mentioned above, hot rolled material reaches a temperature of 800°–1000° C., however, it is preferable to provide a heater or a temperature adjuster to attain a stable bonding strength. The bonding strength can be raised by increasing the temperature of the material. Further, temperature adjustment always enables bonding under a constant condition, which increases the reliability of the bonding apparatus.

Further, according to a second aspect of the invention, there is provided a hot strip mill comprising an intermediate coiler coiling up a sheet bar, a leveler flattening the sheet bar from the intermediate coiler, a bonding apparatus for overlapping the sheet bar from the leveler and effecting bonding, a crop treatment apparatus for removing crops produced during the bonding, and a finishing mill, wherein the bonding apparatus is characterized by the aforementioned bonding apparatus. The bonding apparatus of the present invention can be employed in the hot strip mill and has various effects such that the total length of the mill equipment can be shortened because the time required for the bonding is short, a looper can be omitted, and no break occurs in a bonding area during rolling, so that there is no scratching of the rolling roll surface, because sufficient bonding strength can be attained.

According to a third aspect of the present invention, there is provided a method of bonding metal plates, characterized by overlapping at least two metal plates and then applying a shearing force to at least one portion of the overlapping portions in a thickness direction of the metal plates, and bonding the metal plates while generating a sufficient pressing force that shearing surfaces of the overlapping portions are pressed to each other.

As a method of extending the metal plates to be bonded in the longitudinal direction, it is sufficient to simply apply tensile stress to the metal plates in the longitudinal direction. However, since a large deformation rate cannot be attained when the distance between points of application of the stress is too long, it is preferable to set the distance between the acting points to be short to attain a large deformation rate. The term "longitudinal direction" is used in contrast to the term "thickness direction". That is, it is not necessary to extend the metal plate in parallel to the longitudinal direction, but the extending direction may be inclined to the thickness direction (upward and downward direction of the metal plates to be bonded). The metal plates to be bonded can be strongly bonded by extending the metal plates at the same time and pushing the extending portions against each other nearly in the direction perpendicular to the extending direction.

The deformation rate of 1000% itself is not a critical value. The larger the deformation rate is, the higher the cleanness of the bonded surface becomes, and therefore the stronger the metal plates are bonded. The magnitude of the deformation rate may be controlled, depending on the required absolute value of the bonding strength.

In the bonding of hot rolled plates, the cleanness of the bonded surface is important. By extending the metal plates to be bonded so as to have a very large deformation rate, oxide films formed on the surface of the hot rolled plate are flaked and pealed off to expose a clean surface. Strong metallurgical bonding can be attained by pushing the hot rolled plates against each other so as to sandwich the clean surfaces. Since a generated clean surface is oxidized in a short time in the atmosphere, it is preferable that the produced clean surfaces are not exposed to the atmosphere by applying forces pushing the expanded metal plates against each other so as to bring the clean surfaces into close contact.

There are many variations of the bonding method depending on the method of extending the meal plates to be bonded and the method of applying the forces unevenly pushing the expanded metal plates toward each other. Variations of the bonding method in accordance with the present invention will be described below.

A bonding method bonds two metal plates by overlapping the two metal plates, and then restraining the overlapping portions of the metal plates so that they do not move in the longitudinal direction, and at the same time applying sandwiching pressures to the overlapping part of the metal plates, nearly in parallel to the thickness direction of the metal plates from the upper side and the lower side of the metal plates.

At this moment, the part of the overlapping metal plates to which the pressing pressure is applied acts to be extended and a force is produced to move the metal plates in the longitudinal direction. However, since the metal plates are restrained against movement in the longitudinal direction, a pressure parallel to the longitudinal direction of the metal plates is generated. The produced pressure parallel to the longitudinal direction of the metal plates results in the sandwiching forces pushing the extending portion according to the principle of the present invention. That is, by a single operation of applying the sandwiching pressure to the part formed by the overlapping portion of the metal plates, the metal plates to be bonded can be expanded and the pressures to sandwich the plates can be applied to the expanded portion at the same time. As the method of applying "sandwiching pressures to the metal plates overlapping nearly in parallel to each other in the thickness direction of the metal plates from the upper side and the lower side of the metal plates", something like an opposed-press machine may be used, but it is difficult to obtain a large extension rate using such a machine. Therefore, it is preferable to use a machine in which cutting blades are arranged in an opposite and offset manner, and in which the cutting blades are moved closer to each other like in a pair of scissors. This operation can be easily understood by imagining a situation where a rubber sheet having a large elasticity is cut using a pair of scissors. As the cutting blades of the pair of scissors approach closer to cut the rubber sheet, the rubber sheet cannot be cut off well, but is simply extended because of the high elasticity of the rubber. Similarly, as the portion of the overlapping metal plates are pushed by offset shearing blades from the upper side and the lower side, plastic flow is caused in the metal plates to produce extension of a large deformation rate. The shape of the shearing blade used for sandwiching and pressing the overlapping portions of the metal plates is adjusted, based on the magnitude of the pressure to be applied and the bonding strength to be required. A most simple method of restraining the metal plates so as not to be moved in the longitudinal direction is to mechanically restrain the metal plates by friction forces using clamps. Any method which can restrain the metal plates, for example, a method utilizing electromagnetic forces, can be employed to attain the effect of the present invention.

A generalized example of the aforementioned construction is that "a means for restraining consists of at least two pairs of clamps sandwiching the overlapping metal plates from the upper side and the lower side, and a means for applying the sandwiching pressures consists of a pair of shearing blades placed opposite to each other across the overlapping metal plates and being capable of applying a pressure higher than the yield stress of the metal plates".

The construction can be simplified when one of the pair of shearing blades is a stationary blade and the other is a movable blade, and when one of the clamps among the two pairs of clamps placed opposite to the movable blade serves also as the stationary blade.

In the above construction, the most dominant factor to determine the magnitude of the bonding strength is the degree of extension of the metal plates. That is, the degree of extension becomes large as the operating stroke of the shearing blades becomes large. In a case of bonding plates made of a steel material, in order to obtain the bonding strength generally required, it is preferable that an operating stroke of the pair of shearing blades after being brought in contact with the upper surface of the metal plates is larger than 50% of the plate thickness of a metal plate.

In order to further increase the bonding strength, it is preferable that the pair of shearing blades overlap with each other along an extending line of the operating locus of the shearing blade. The term "overlap" means that there is a portion where the upper shearing blade overlaps on a part of the lower shearing blade when the upper shearing blade is seen from directly above. By utilizing an arrangement as described above, the pressure on the bonding surface occurred during expanding of the metal plates becomes large and accordingly the strength of bonding becomes large. In a case of bonding plates made of a steel material, in order to obtain the bonding strength generally required, it is preferable that the amount of overlap between the shearing blades is 0.1 mm or more. However, when the amount of overlap is larger than 10 mm, there is the possibility that cracks will occur in the width end portions of the metal plates. The above value is a criterion to determine the amount of the overlap between the shearing blades, and the most preferable amount may be experimentally determined based on the criterion.

The part referred to as the shearing blade in the above description can be referred to by the term "pressing jig" as well, because it is not always necessary to use a blade.

In the bonding apparatus, it is also possible that one of the pair of blades is a stationary blade and the other is a movable blade, and one of the clamps among the two pairs of clamps placed opposite to the movable pressing jig serves also as the stationary blade.

In the above construction, there is no problem, from the view point of bonding, for the shape of the movable pressing jig to be a rectangle. However, from the view point of flatness of the bonded area after bonding, a preferable shape for the movable pressing jig is one in which the height of a side close to the bonded portion of the metal plate to be bonded in the upper side is the lowest and other side spaced from the bonded portion of the metal plate to be bonded is higher. That is, it is preferable when the movable pressing jig is formed in such a shape that the cross-sectional shape of the movable pressing jig as seen from the width direction of the metal plate is a sector or a trapezoid in which the side connecting both edge portions of the movable pressing jig is a smooth curve.

The overlapping portion of the metal plates is formed not only by simply stacking metal plates to be bonded, but may be formed by butting two metal plates and putting a third metal plate over the butting portion. Although the bonding process in accordance with this method is more complex than in the aforementioned method, there are advantages in that the flattening process after bonding can be omitted and the amount of crop generated during bonding is small.

Further, the upper clamp and the lower clamp in each of the two pairs of clamps placed in the upper side and in the lower side of the metal plate are linked and the two pairs of clamps are moved in parallel to each other so that the two pairs of clamps also serve as a pair of pressing jigs. Although the basic construction of the present invention is composed of six jigs, that is, two pairs of clamps and a pair of shearing blades, each of the jigs may also serve the function of the other jig. In the method of the above case, the effect of the present invention can be attained by a total number of four jigs. The characteristic of the above case is that the clamps arranged on the upper side and on the lower side are linked to perform operations of extending and sandwiching to press the metal plates by moving the clamps arranged on the upper side and on the lower side at the same time and in parallel. However, since a large stress acts on the link mechanism, it is necessary to design the link rods and the pivot portions connecting the link rod and each of the clamps so as to have sufficient strength. Therefore, it is believed that the bonding apparatus described above is also suitable for a case where the metal plates to be bonded are formed of aluminum or copper, which has a small yield stress.

It is preferable to apply the aforementioned bonding apparatus to a hot strip mill facility which comprises an intermediate coiler for coiling a metal plate, a leveler for flattening the metal plate coming out from the intermediate coiler, a bonding apparatus for overlapping and bonding the metal plate coming out from the leveler, a crop disposing apparatus for cutting off crop produced during bonding and a finishing mill.

Describing the present invention in more detail, a preceding sheet bar and the following sheet bar are overlapped in the line of the hot strip mill facility, a predetermined amount of overlap of the shearing blades is set to a specified value to produce a stress large enough to cause plastic flow deformation in the part of the overlapping portion of the sheet bars, at least one of the shearing blades, the shearing blade in the upper side or the shearing blade in the lower side, is pushed into the sheet bars in the thickness direction of the sheet bars from the upper side to the lower side or from the lower side to the upper side, and plastic flow deformation is caused in the two bars to press-bond the surfaces of the upper bar and the lower bar. FIG. 3 shows an example of the arrangement of shearing blades where the upper shearing blade is pushed downward. Therein, when the pushing depth (D) of the shearing blade is set to a value larger than the thickness of the sheet bar, the leftover end portion not contributing to the press-bonding can be cut off (crop-removing) during the deformation process, and accordingly it is not always necessary to introduce a separate apparatus for crop-removing. As the bonding atmosphere, an atmosphere and a non-oxidized atmosphere, including a vacuum, may be acceptable. It is clear when considering the bonding mechanism that a better bonding result can be obtained if the present invention is performed in a non-oxidized atmosphere.

The key point of practical use of sheet bar bonding is whether the bonding can be performed in a short time, and the bonding strength is acceptable if the bonding area does not break in the next rolling process. The present invention is realized by considering this point and eliminating unnecessary processes. That is, as described above, a preceding sheet bar and the following sheet bar are overlapped, the overlapping portion of the bars is arranged between the upper and the lower shearing blades in which the amount of overlap of the shearing blades is set to a specified value to produce a stress large enough to cause plastic flow deformation in the part of overlapping portion of the bars. Further, the sheet bars are restrained by clamping, and the two sheet bars are deformed by moving at least one of the shearing blades, the shearing blade in the upper side or the shearing blade in the lower side, into the sheet bars in the thickness direction from the upper side to the lower side or from the lower side to the upper side to press-bond the surfaces of the upper bar and the lower bar. Therein, whether the bars can be bonded or not depends on whether sufficient plastic flow deformation is caused in the metal plates and whether the pushing pressure necessary for close contact is applied to the metal plates. That is, when plastic flow deformation occurs, the oxide films attached on the surface of the bar cannot withstand the deformation and are flaked and pealed off from the surface. Therefore, the contact surfaces are cleaned and at the same time and pushed toward each other so as to be strongly bonded. In addition to this, when the surfaces of the bars are rubbed in the deformation process, the bonded surfaces are activated and the bonding strength is further improved. In general, it has been confirmed that bonding capable of sufficiently withstanding rolling can be attained with a pushing speed of the shearing blade of nearly 1 mm/s even in the atmosphere. However, when a bar (soft steel) having a temperature above 800° C. is deformed with a fast pushing speed higher than 500 mm/s, friction heat is generated due to the rubbing action described above so that the surfaces of the bars are melted or brought to a semi-molten state, and dispersion of the oxide films on the surface is accelerated and the bonding performance is further improved. An increase in the pushing speed is very effective for increasing the bonding strength since the increase in pushing speed activates the contact surface even if the contact surfaces are not melted.

In order to obtain a bonded portion capable of withstanding rolling, it is necessary to cause the bars to closely contact each other by applying sufficient pushing force in the plastic flow deformation process and the bonding process. The inventors of the present invention conducted various tests with the bonding method, as shown in FIG. 17, and found that by setting a position of the lower shearing blade within the movable range of the upper blade, as shown in FIG. 17, plastic flow deformation took place by pushing with the shearing blade, and the plastic flow deformation caused a pushing force between the bonded surfaces of the bars, causing the bars to closely contact each other. That is, by properly adjusting the positions of the upper and the lower shearing blades, a pushing force is generated as the bars are deformed with plastic-flow and bonded, as shown in FIG. 19, and the bonded portion is strong enough to withstand rolling.

Further, in order to generate a larger pushing force in the process of pushing the shearing blade, the shape of the shearing blade is important. For example, a large pushing force can be generated by setting the radius of the top end portion in the shape shown in FIG. 19 to 240 mm. On the contrary, in a case where the shape of the top end portion is designed to be 12 degrees, as shown in FIG. 14, the pushing force is smaller than in the case of FIG. 19. Although it is necessary for the pushing force to be varied depending on the material of the metal plates to be bonded, the pushing force can be varied by changing the shape of the shearing blade. When the shape of the shearing blade is designed in a straight shape as shown in FIG. 15, the whole width can be bonded, but a large pushing force is required. However, it has been experimentally determined that sufficient bonding strength capable of withstanding rolling can be obtained when the edge portion is strongly bonded. Therefore, bonding over the whole width is not always necessary. Further, it is possible for the shearing blade to be designed in a wave-form shape as shown in FIG. 29 to bond the plates discretely.

As described above, the present invention has been made by observing the bonding process of metal bars in detail.

According to the present invention, since the leading end of a bar and the trailing end of a bar can be bonded to each other, the bars can be continuously connected. Further, since the bonding method is simple and does not require any additional heating energy, the method has an advantage in affording good maintainability of the apparatus. Furthermore, since the bonding method is essentially a solid-phase diffusion bonding method and burrs are not produced in the bonded area, the bonding time is basically determined by the pushing speed. For example, when it is considered that the pushing speed is as high as 100 mm/s, it can be understood that the method of the present invention is capable of shortening the bonding time. In addition to these features, although it is confirmed that bars can be firmly bonded by setting the pushing stroke to a value larger than 0.7 times the thickness of the bar, it is preferable that the pushing stroke is set to a value larger than the thickness of the bar when crop removal and bonding are performed at the same time. In this case, no apparatus for crop removal is required. Therefore, the present invention is the best method of continuously bonding bars.

BRIEF DESCRIPTION OF THE DRAWINGS

FIGS. 4(a) to 4(g) are views showing the outline of a bonding process in accordance with the present invention.

FIG. 6 is a chart showing an example of the sequence and the elapsed time of the bonding work in accordance with the present invention.

FIG. 7 is a graph showing the relationship between the thickness of the bar and the amount of lapping in accordance with the present invention.

FIG. 10 is a chart showing the relationships among the temperature of a bar, and the pressing speed, and the presence and absence of melting in accordance with the present invention.

FIG. 11(a) is a side view showing an embodiment of a bonding apparatus in accordance with the present invention, and FIG. 11(b) is a side view of the bonded plate.

FIG. 12(a) is a side view showing an embodiment of a bonding apparatus in accordance with the present invention, and FIG. 12(b) is a side view of the bonded plate.

FIG. 13(a) is a side view showing an embodiment of a bonding apparatus in accordance with the present invention, and FIG. 13(b) is a side view of the bonded plate.

FIG. 14(a) is a side view showing an embodiment of a shearing blade shape of a bonding apparatus in accordance with the present invention, and FIG. 14(b) is a side view of the bonded plate.

FIG. 31(a) is a view, taken from an upper direction of a sheet bar, and FIG. 31(b) is a side view of an example of a bonding apparatus of the present invention.

FIG. 32(a) is a view, taken from an upper direction of a sheet bar, and FIG. 32(b) is a side view of an example of a bonding apparatus of the present invention.

DESCRIPTION OF THE EMBODIMENTS

Figure 1:
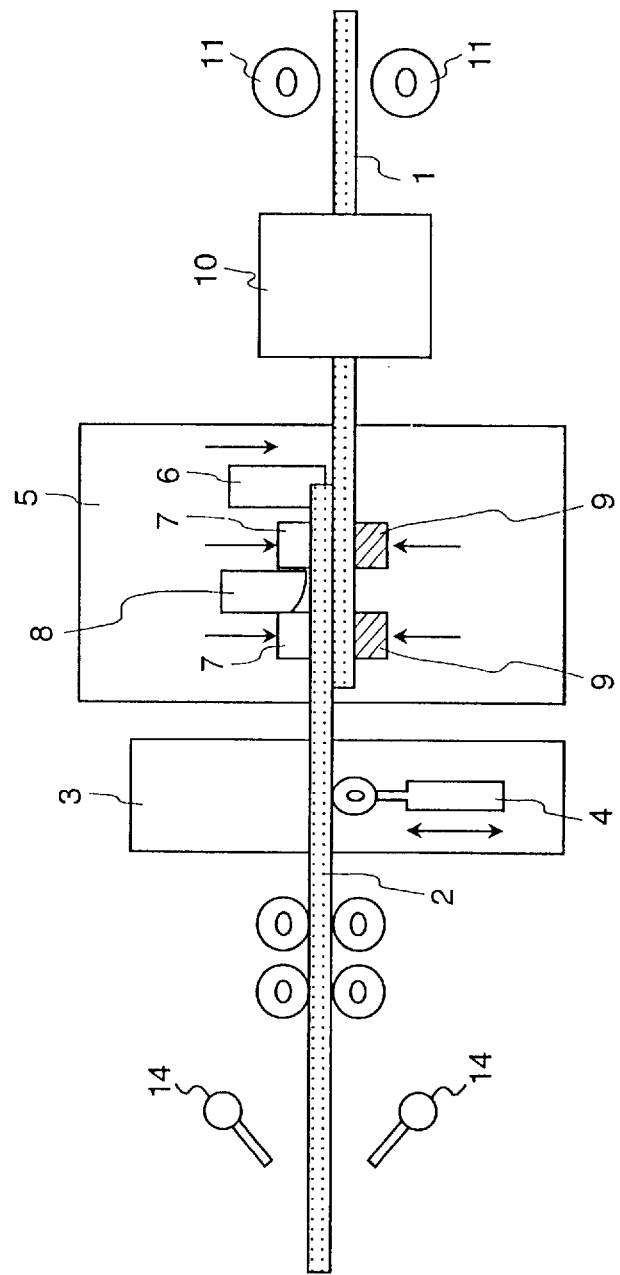
FIG. 1 is a longitudinal view showing the basic construction of an embodiment of a bonding apparatus for hot rolled plate in accordance with the present invention.

FIGS. 2(a) to 2(e) are views showing the principle of bonding used in accordance with the present invention. FIGS. 2(a) to 2(d) show plates as seen from a side position of the plates. End portions of the two plates to be bonded are overlapped. The overlapping portions of the plates are clamped from the upper side and the lower side so as to be fixed, as seen in FIG. 2(a). Then, a shearing blade is moved downward, as seen in FIG. 2(b). Between the extending region of the operating locus of the shearing blade and the clamp in the lower side (the clamp in the lower side may be called a "lower shearing blade") there is an overlap portion shown by hatching in FIG. 2(a). In accordance with the present invention, the hatched portion is referred to as "an overlap" portion. This portion is squeezed from the upper side and the lower side, and the pressure in this portion is gradually increased to a high level as the shearing blade is moved downward, because the metal plates to be bonded are restrained between the clamps so that the pressure can be released only in the lateral direction, as seen in FIG. 2(e). Due to this pressure, the metal in the squeezed portion is extruded in the longitudinal direction of the metal plates, and the squeezed portion of the metal plates is subject to plastic flow deformation, as seen in FIG. 2(c). In this case, the metal plates are subject to large plastic deformation without being separated by the pressure of the squeezed portion. Although the plastic deformation depends on an amount of overlap, the plastic deformation rate at this time becomes 1000% or more at a portion (for example, a portion near the first contact point between the upper shearing blade and the upper metal plate) in a case where the amount of overlap is 2 mm and the thickness of the metal plate is 200 mm. It is difficult to produce such a high deformation ratio in a common work process, but the sandwich squeezing in accordance with the present invention can realize a high deformation ratio. After the upper shearing blade has been lowered until the upper surfaces and the lower surfaces of the upper plate and the lower plate are in substantial alignment with each other, movement of the upper shearing blade is stopped. In accordance with the present invention, a strong bonding can be obtained by pushing the plastic flow deformed portions of the upper and the lower metal plates to each other, as seen in FIG. 2(d). It is considered that the surface of the portion which is submit to plastic flow deformation is activated, and consequently a strong metallic bonding can be obtained by a small pushing force (in this case, the force is the result of stress parallel to the longitudinal direction of the metal plates).

In contrast, since the main purpose of the conventional bonding method is to cut off the metal plate by shearing, there is not any overlap portion as in the present invention. That is, an apparatus which employs the conventional method is like a pair of shearers for cutting metal plate by shearing. In such a case, sufficient pressure is not produced, since there is no sandwich portion. That is, in such a conventional construction there is a problem in that the bonding strength is weak because sufficient plastic flow deformation does not occur as in the present invention. Further, since plastic flow deformation does not occur in such a conventional construction, a metal plate in contact with a crop is cut off at the bonding in most cases.

Embodiments of the present invention based on the above principle will be described in detail below.

Embodiment 1

FIG. 1 shows the basic construction of a facility suitable for applying the present invention. The reference character 1 designates a preceding bar and the reference character 2 denotes the following bar. There is provided an apparatus 3 for overlapping the following bar on the preceding bar. The overlapping is performed by conveying the following bar onto the preceding bar by operating a lifting device 4, adjusting the extent of the overlapping and setting the positions of the upper and the lower shearing blades using a position adjusting machine 6 incorporated in the bonding apparatus 5. There is provided a necessary overlap between the upper and the lower shearing blades to produce sufficient plastic flow deformation. Then, after both rolled blocks are clamped by a clamping mechanism 7, an upper shearing blade 8 is pushed toward the lower blade 9 to a depth of ⅔ or more of the thickness of a bar to bond the bars by causing plastic flow deformation. Crop separation is performed using a crop separation machine 10, and further the bar is flattened using a leveling roll 11. Thus, the series of bonding processes are completed. The bar is transferred to a finishing rolling mill soon after completion of the bonding. Therein, more stable bonding can be attained if a process 14 for removing oxide films on the surface of the bar is employed before bonding.

In order to perform continuous hot rolling of bars having a width of 1200 mm and a thickness of 20 mm using the facility shown in FIG. 1, after overlapping a preceding bar and the following bar having a temperature of 1000° C. and clamping the bars, the preceding bar and the following bar are bonded by producing plastic flow deformation by pushing in an upper shearing blade having a shape shown in FIG. 4 toward the direction of the plate thickness with a pushing-in speed of 0.1 m/s, crop separation is performed, and then the bar bent by the deformation is passed through the leveling roll in order to flatten the bar. Thus, the bonding is completed. The overlap Lg between the upper shearing blade and the lower shearing blade is 1.5 mm. The pushing depth is set to 22 mm. Here, the indication of the amount of overlap Lg indicates that the positions of the upper shearing blade and the lower shearing blade are in the relationship shown in FIG. 3. That is, it indicates that part of the lower shearing blade is positioned within the moving path of the upper shearing blade.

Figure 5:
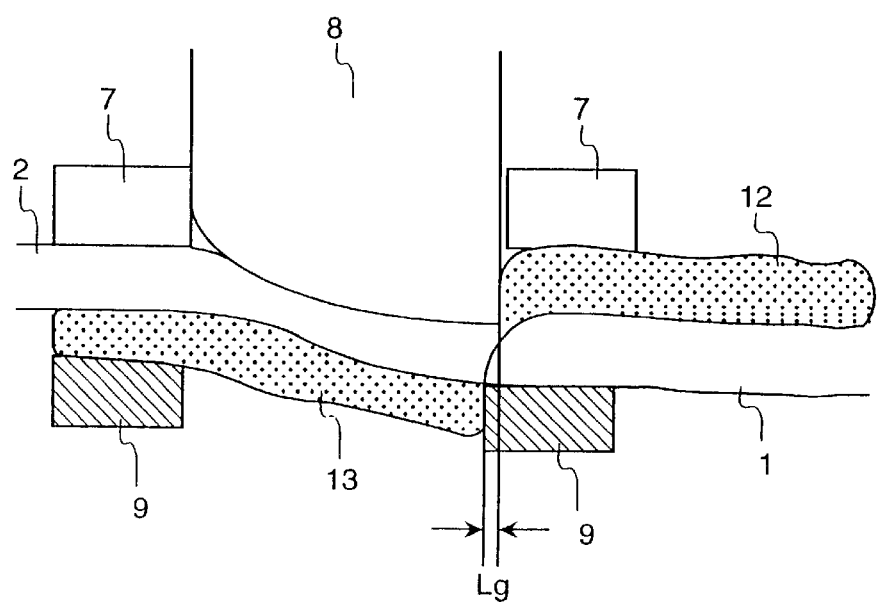
FIG. 5 is a side view showing a press bonding process at plastic flow deformation in the figure showing the principle of bonding in accordance with the present invention.
Figure 1A:
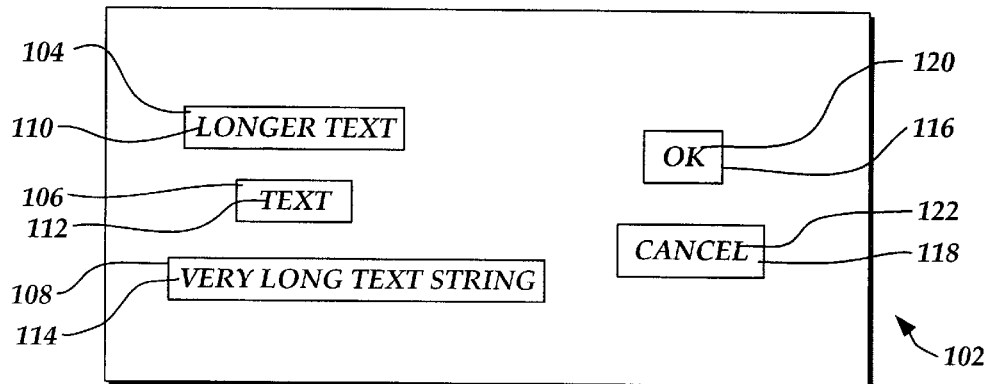
Figure 1B:
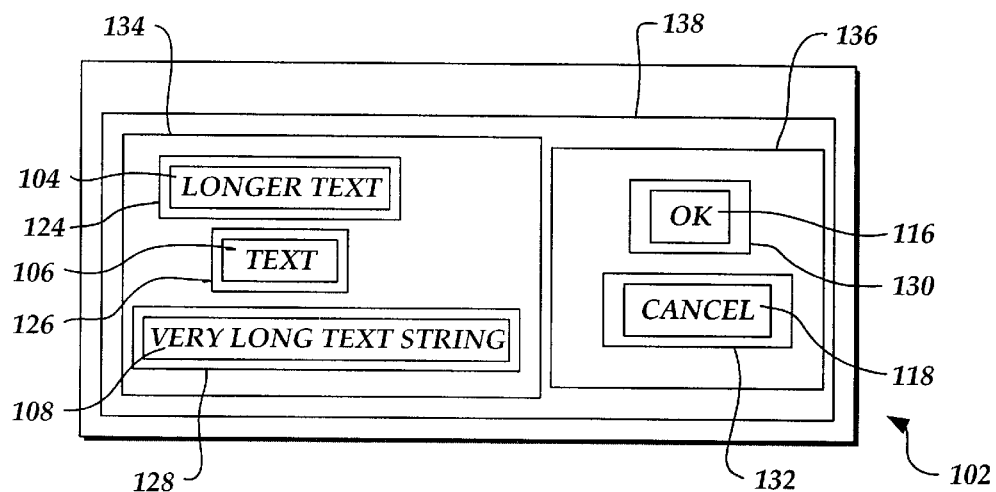

Next, the bonding principle using the bonding apparatus 5 according to this embodiment will be described below, referring to FIGS. 4(a) to 4(g) and FIG. 5. FIGS. 4(a) to 4(g) show the bonding processes, and FIG. 5 shows the details of the press bonding process during plastic flow deformation. The reference character Lg designates an overlap between the upper and the lower shearing blades. After placing the overlapping portions (FIG. 4(a)) of the preceding bar and the following bar between the upper shearing blade and the lower shearing blade and clamping both bars that they do to not move during the plastic flow deformation process (FIG. 4(b)), the preceding bar and the following bar are deformed by pushing the upper shearing blade (the lower shearing blade depending on the mechanism) into the bars (FIG. 4(c)). Oxide films are flaked and pealed off. Further in the deforming process (FIG. 4(d)), the pushing force acts between the bonded surfaces to closely attach bars and leftover ends 12, 13 are crop-separated (FIG. 4(f)). Therefore, in this embodiment, a crop separating machine is not needed and the bar is transferred to the leveling roll to perform the flattening process (FIG. 4(g)).

FIG. 6 shows an example of the sequence and the elapsed time for the bonding work using the bonding apparatus 5. The sequence of processes is overlapping, closing of the clamps, closing of the upper and lower shearing blades, plastic flow deformation (bonding), opening of the clamps and the shearing blades, separating the crop and flattening treatment, and the total time required for bonding is 3 seconds. The net bonding time, that is, the time required for the plastic flow deformation is 0.2 second in this embodiment, and accordingly it can be said that the present invention as the best method to shorten the bonding time.

It has been described above that the overlap Lg between the upper shearing blade and the lower shearing blade and the positional relationship between the upper shearing blade and the lower shearing blade are important for flaking and pealing the oxide films and effecting a pushing force on the bonded surfaces. These features will be described below in more detail with reference to FIG. 7. FIG. 7 is a graph showing the relationship between thickness of the bar and the amount of overlap Lg in accordance with the present invention. The bonding was performed under a suitable atmosphere and the temperature of the bar was approximately 1000° C. The bonding strength was determined by determining a bonded area from a broken surface of a test piece after a tensile test and dividing the breaking load by the bonded area. The pushing speed was 0.1 m/s. The pushing depth was set to a value equal to the thickness of the bar. The plus and minus signs attached to the amount of overlap indicate the positional relationship of the upper and the lower shearing blades as described above. Large bonding strengths were obtained when the overlap was positive, and bonding strengths stronger than the strength capable of withstanding rolling were obtained when the amount of overlap was larger than +0.1 mm in the case of a thickness of 20 mm, and when the amount of overlap was larger than +0.3 mm in the case of a thickness of 30 mm. The maximum strengths were obtained when the amount of overlap was −3 mm in the case of a thickness of 20 mm, and when the amount of overlap was −0.6 mm in the case of a thickness of 30 mm. Although an optimum amount of overlap varies depending on the thickness of the plate, it is clear that a bonding strength capable of withstanding rolling can be obtained by setting the amount of overlap within the range of 0.5 to 15 mm within the thickness of an applicable bar.

Figure 8:
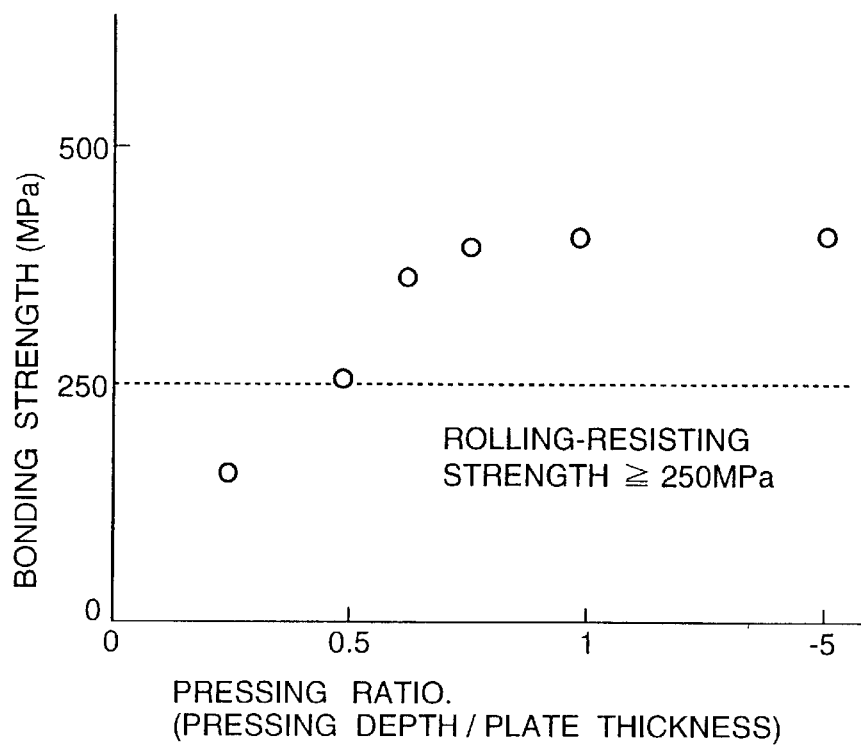
FIG. 8 is a graph showing the relationship between the pressing ratio and the bonding strength in accordance with the present invention.

FIG. 8 shows the relationship between the pushing ratio and the bonding strength. The plate thickness was 20 mm, and the amount of overlap Lg was 5 mm. The pushing speed was 0.1 m/s. The result shows that bonding strength higher than the strength capable of withstanding rolling of 250 MPa could be obtained when the pushing depth was deeper than nearly ⅔ of the plate thickness. The same results were obtained for a case of a plate thickness of 30 mm. Therein, the strength capable of withstanding rolling is a value obtained from a result of studying the relationship between the strength of the bonded portion and the rolled ability.

Figure 9:
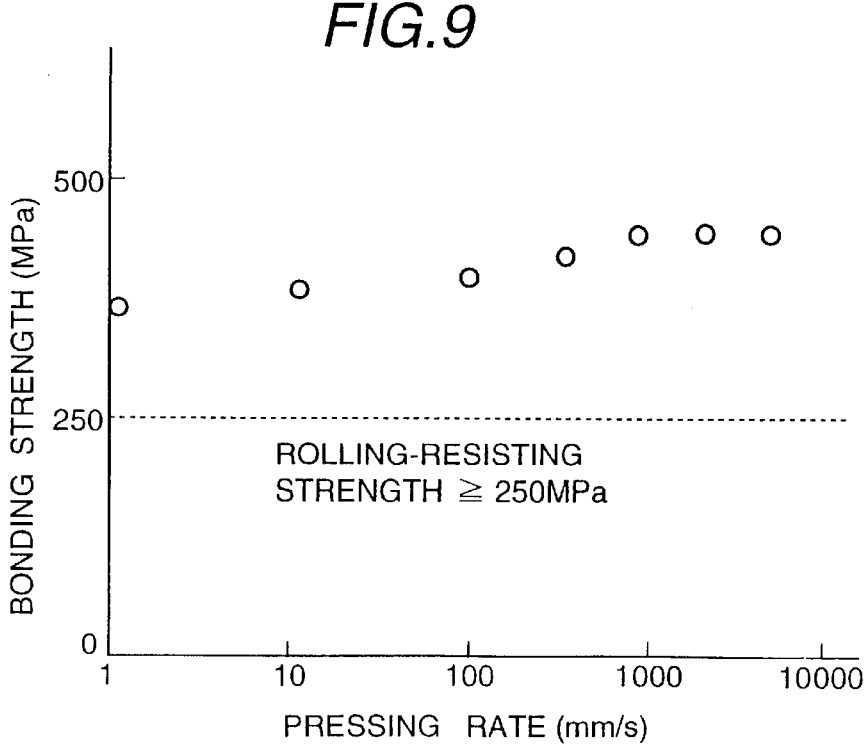
FIG. 9 is a graph showing the relationship between the pressing rate or speed and the bonding strength in accordance with the present invention.
Figure 15:
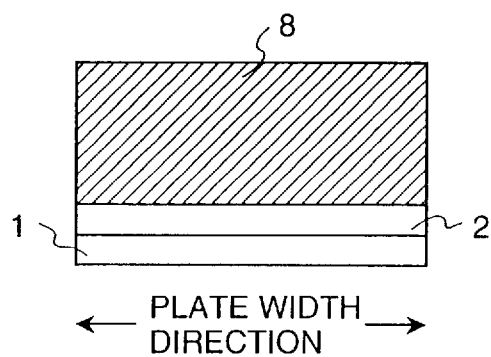
FIG. 15 is a cross-sectional view showing an embodiment of a shearing blade of a bonding apparatus in accordance with the present invention as seen from the direction of the plate width.

FIG. 9 shows the relationship between pushing speed and bonding strength. The amount of overlap Lg was set to a constant value of 5 mm, and the plate thicknesses were 20 mm and 30 mm. Within the range of the experiment, the bonding strength increased as the pushing speed was increased from 0.001 to 0.4 m/s. When the pushing speed exceeded 0.5 m/s, an increase in the strength could be clearly observed. The reason for an increase in the strength is that the bonded surfaces are melted by rubbing action in the plastic flow deformation process. That is, a flaking of the oxide films and the existence of a liquid phase contribute to the improvement of the bonding ratio.

However, FIG. 9 also shows that, in order to obtain the strength capable of withstanding rolling, it is not always necessary to increase the pushing speed, and it may be possible to select a proper pushing speed within the restrictions of the bonding time and the manufacturing apparatus.

FIG. 10 is a chart showing the relationships among the temperature of the bar, and the deforming speed (Va), and the presence and absence of melting. From FIG. 10, it is seen that, when the deforming speed is above 0.5 m/s in the case where the temperature of the bar is 800° C., the bonded surfaces are melted, the deforming speed at initiation of melting shifts toward the low speed side as the temperature of the bar is increased, and the deforming speed is 0.4 m/s in the case where the temperature of the bar is 1200° C. Although the results for bars having a melting initiation temperature above 1400° C. is the same, it is seen that the melted depth is larger and the melted ratio is increased as the melting initiation temperature is lower. The judgement as to whether melting exists or not is performed by determining whether the central surface of the bar is melted more than 60% or not. The melted depth is a value obtained by corroding a polished cross section and then by judging the state from the metallurgical structure.

Since the melted amount is small even when the pushing speed is large enough to produce a melting portion, the bars can be bonded without a burr.

As described above, according to the present embodiment, strong bonding can be attained by overlapping a preceding bar and the following bar, adjusting the overlap of the upper shearing blade and the lower shearing block after clamping the bars, and causing plastic flow deformation in the bars through more than $\frac{2}{3}$ of the thickness. Crop separation can be performed depending on the pushing depth in the plastic flow deformation process. Unnecessary leftover ends can be disposed of at the same time. Therefore, it is possible to improve the productivity and production yield and to realize automatic operation by continuous operation until completion of rolling in a hot rolling mill facility.

Although the present invention mainly deals with steel materials, the present invention still can be employed when the objective material is changed. For example, the present invention can be applied to a material covered with a strong oxide film, such as an aluminum alloy. Since the deforming characteristic and the oxide film characteristic are different from those of steel materials, it has been confirmed that a strong bonding can be attained by suppressing the amount of overlap to a value smaller than that for steel materials and by producing a larger plastic flow deformation than that for a steel material. As described above, the present invention can be applied to a non-steel line.

Increasing the amount of overlap in accordance with the present invention means that the sheared end portion of an upper plate is pushed against a lower plate and deformed. That is, as the length of the overlap Lg becomes larger, the pushing force during rubbing of the upper plate and the lower plate becomes larger and the plastic deformation of both plates becomes larger. In the case of a positive value of overlap, the sheared surface end portions of the upper plate and the lower plate are rubbed only a little, the fresh surfaces of both plates are in contact with each other, the pushing force and the plastic deformation are small though the plates are bonded, and accordingly only insufficient bonding strength can be obtained as a result. The necessary amount of overlap depends on the kind and the thickness of the plates to be bonded.

Figure 2:
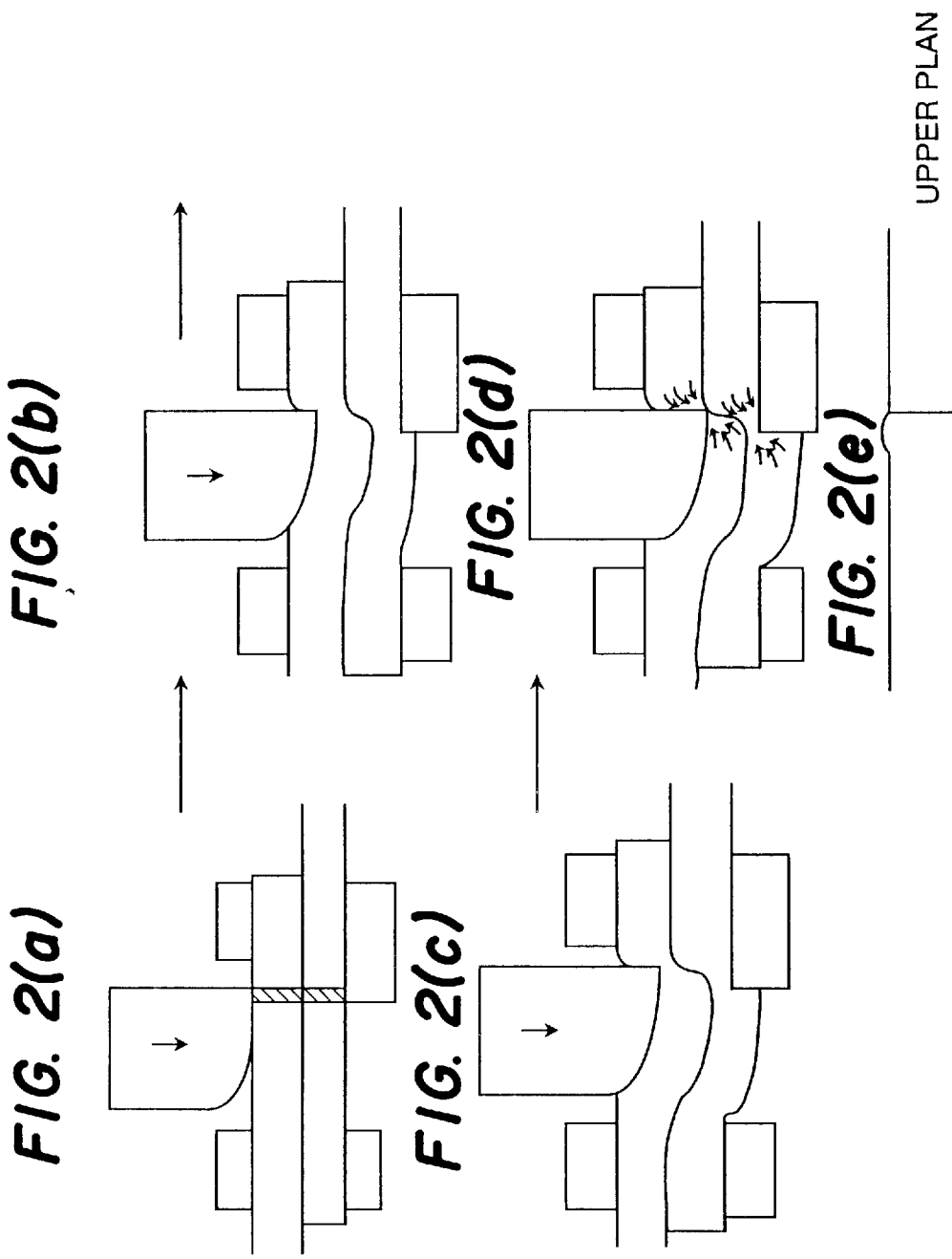
FIGS. 2(a) to 2(d) are side views and FIG. 2(e) is a top plan view showing the principle of bonding in accordance with the present invention.

The characteristic of FIG. 2 is in the shape of the upper shearing blade. It is sufficient only that the upper shearing blade rubs the sheared surface, and deformation of the other portions results simply in the loss of energy. In the past, a method has been employed in which an upper plate is shifted downward so that the level of the upper plate and the level of the lower plate are brought to the same level. In accordance with the present invention, the positions of the clamps for the upper and the lower plates are not changed and the shearing blade is designed to have a shape such that the shearing blade has an inclined surface when it is seen from the side direction, that is, the shearing blade has such a shape that the upper plate and the lower plate are at the same level at the bonded surface of the upper plate and the holding position of the plates is not changed at the clamping positions. Thereby, the construction of the bonding apparatus becomes simpler and the energy loss can be decreased as compared to the apparatus where the setting position of the upper plate is changed.

Embodiment 2

The basic construction of this facility is similar to that of Embodiment 1, and the shearing blades and the clamps are formed in the shapes shown in FIG. 11($a$). The clamping mechanism 7 and the lower shearing blade 9 are inclined in parallel. By this construction, the clamping mechanism 7 and the lower shearing blade 9 are inclined in parallel so that a large pushing force is generated in the bonded surface during the process where the shearing blade 8 is pushed against the metal plates 2. In this case, an overlap portion is provided between the upper shearing blade 8 and the lower shearing blade 9 so that a sandwiching pressure is generated. Since a large pushing force is generated in the bonded surface, the bonded strength becomes large and the shape of the bonded portion after bonding becomes flat, as seen in FIG. 11($b$). Therefore, there is an advantage in that the leveling process after bonding can be eliminated.

Embodiment 3

As shown in FIG. 12($a$), the upper shearing blade 8 and the lower shearing blade 9 are linked in parallel. With this construction, by lowering the upper shearing blade 8, a force sandwiching the metal plates 1, 2 is generated between the upper shearing blade and the lower shearing blade. Plastic flow is caused by the sandwiching, and accordingly the plates are bonded using the same principle as in Embodiment 1. With this construction, since the metal plate after bonding is also flattened, as seen in FIG. 12($b$), the leveling process after bonding can be eliminated.

Embodiment 4

As shown in FIG. 13($a$), two metal plates to be bonded are butted after the end portions of the two plates are cut off so as to be butt-bonded, and the cut high temperature metal plate 15, or a high temperature metal plate 15 prepared in advance, is placed on the upper surface, or on the lower surface of the butted portion of the metal plates, and the shearing blade is pushed from the upper surface, or the lower surface, to bond the plates. In this method, although the crop treatment and the pre-treatment, such as cutting, for butting are added, the leveling process can be eliminated, as seen in FIG. 13($b$). In this case, even when there is no overlap between the upper shearing blade 8 and the lower shearing blade 9, a high pressure is generated in the metal plates by wedge-effect and sufficient plastic flow deformation can be caused.

Further, it is possible to bond the metal plates by overlapping two metal plates instead of using three metal plates, as seen in FIGS. 14(a) and 14(b). That is, in accordance with the present invention, a sandwiching pressure (may be called a "confined pressure") is applied to a very small portion of the metal plates to be bonded regardless of the arrangement of the shearing blades to cause a deformation which is larger than a general plastic deformation rate in the metal plates, thereby to obtain a strong bonding strength.

Embodiment 5

Figure 16:
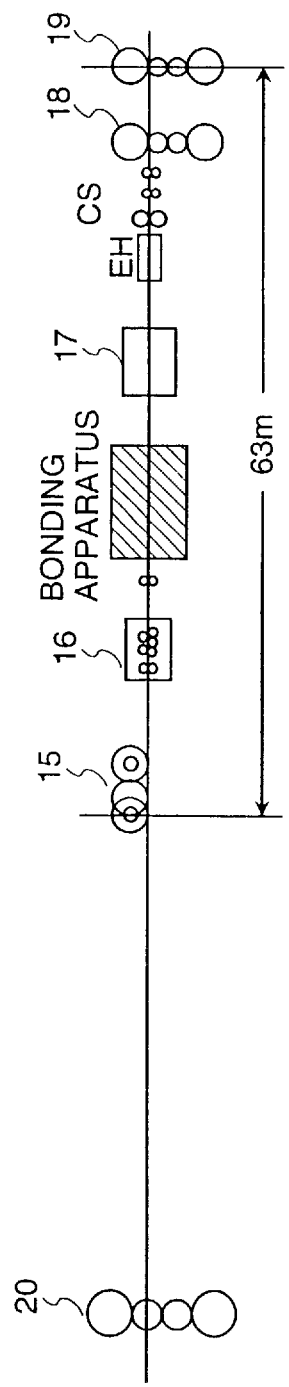
FIG. 16 is a diagrammatic view showing a whole rolling mill facility in accordance with the present invention.

FIG. 16 is a view showing a hot rolling mill facility in accordance with the present invention. Since the speed of the finishing mill downstream of the bonding apparatus is higher than the speed of the continuous casting machine (not shown), an apparatus for controlling the speed of coiling of metal plate, called an intermediate coiler 15, is required between the coarse rolling mill 20, for producing a rolled block from the continuous casting machine, and the bonding apparatus in order to match the diverse speeds of the line. After flattening the metal plate by removing the coiling hysteresis produced by the intermediate coiler using a leveler 16, the metal plates are bonded using the bonding apparatus. The bonding apparatus performs bonding while running on rails. Since cut leftovers called crops are produced in the case of using the bonding apparatus according to the present invention, crop treatment 17 for removing crops is performed and the final product is produced by passing the metal plate through the finishing rolling mills 18, 19. Since the bonding apparatus according to the present invention performs bonding within 3 seconds, the running distance of the bonding apparatus can be shortened. Thereby, the distance between the intermediate coiler and the finishing rolling mill can be made within 65 m. Therefore, the continuous hot rolling facility can be made small.

Embodiment 6

Figure 17:
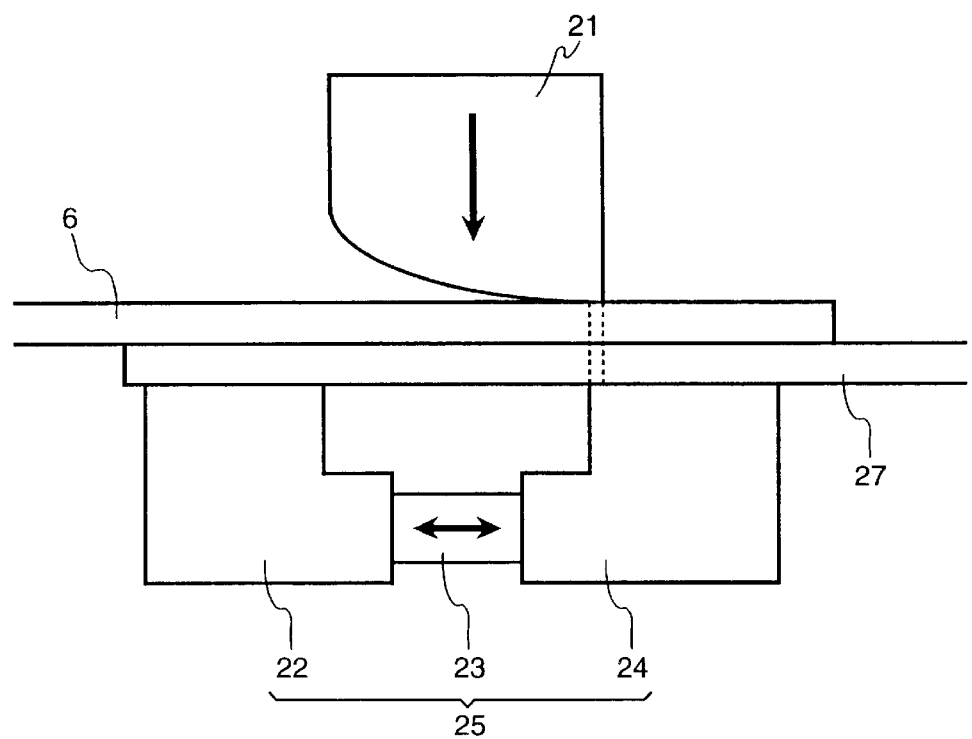
FIG. 17 is a side view showing the basic construction of a bonding apparatus for hot rolled plate in accordance with the present invention.
Figure 18:
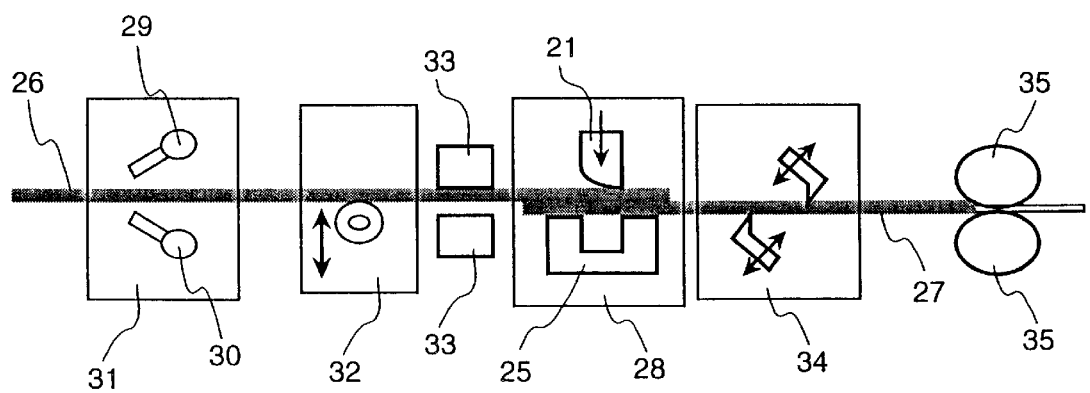
FIG. 18 is a diagrammatic view showing the bonding apparatus of the present invention when assembled in a hot strip mill.

FIG. 17 shows the fundamental construction of a bonding apparatus according to the present invention. Reference number 21 denotes an upper shearing blade and reference number 25 a lower shearing blade. The lower shearing blade 25 is divided into a bonding side lower shearing blade 22 and a material support lower shearing blade 24 and the lower shearing blades 22 and 24 are connected to each other by an overlap adjustor 23. Reference number 27 denotes a preceding bar and reference number 26 a following bar. FIG. 18 is an example of the fundamental construction in which a bonding apparatus of the present invention is applied to a continuous hot strip mill facility. Reference number 27 denotes a preceding bar and reference number 26 denotes a following bar. Oxide films on the surfaces of the bars 26, 27 are removed by a descaling apparatus 31 before the bars are overlapped.

The facility is provided with a lifter 32 for raising up the following bar 26 onto the preceding bar 27. The bars are heated by a heater 33 to a predetermined temperature after the overlapping of the bars. The distance between the lower shearing blades 22 and 24 form a concave portion of the lower shearing blade 25 which is adjusted so that a necessary overlap exists between the upper shearing blade 21 and the material support shearing blade 24 as required to cause sufficient plastic flow. The upper shearing blade 21 is pressed into the bars to an extent of the thickness of one bar or more to cause plastic flow thereby to bond the bars. Crops formed during the bonding are separated by a crop separator 34, and then the bonded bar is transferred to a finish rolling mill 35. The descaling apparatus is provided with water sprays 29 and 30 disposed at upper and lower sides of the bars.

Figure 19A:
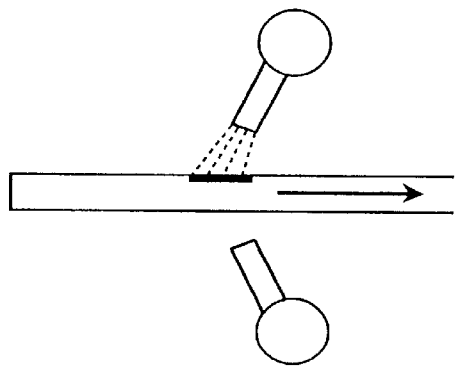
FIGS. 19(a) to 19(h) are diagrammatic views showing the outline of a bonding process in accordance with the present invention.
Figure 19B:
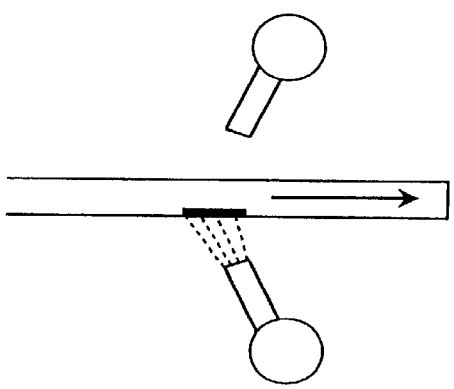
Figure 19C:
Figure 19D:
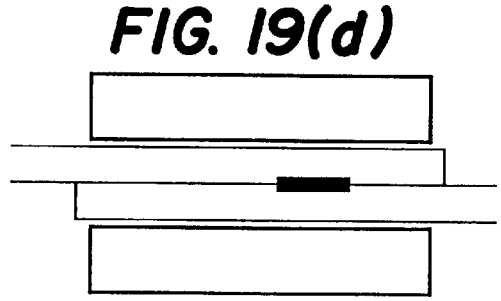
Figure 19E:
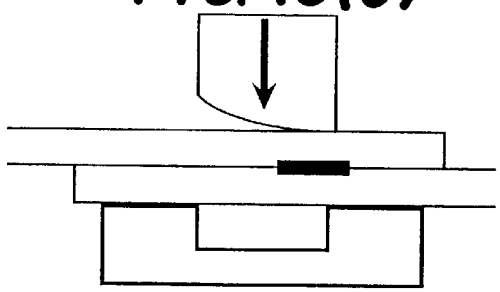
Figure 19F:
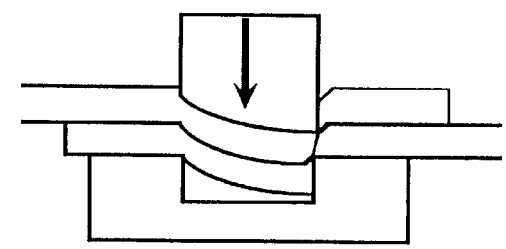
Figure 19G:
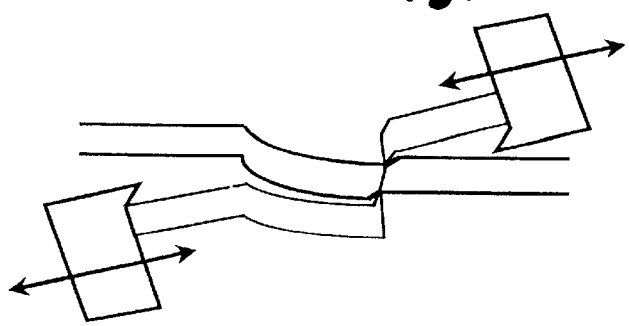
Figure 19H:
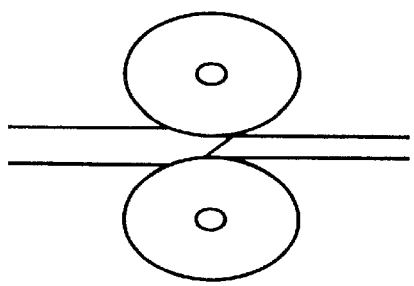

In the facility shown in FIG. 18, continuous hot rolling of a bar (soft steel) having a width of 1500 mm and a thickness of 30 mm was performed. Partial descaling of a preceding bar having a temperature of 1000° C. and a following bar having a temperature of 900° C. was effected by high pressure water spraying, and then the bars were overlapped. The overlapping portion was heated and adjusted to be 950° C., and then transferred to the bonding apparatus. The bonding apparatus was as shown in FIG. 17. Here, the amounts of overlap between the upper shearing blade 21 and the bonding surface side lower shearing blade 22 and the material support lower shearing blade 24 were adjusted to be 3 mm and 0 mm, respectively. The upper shearing blade 21 had an arcuate shape, as shown in FIG. 17, the radius of the arcuate portion being R240. The length of the blade in the longitudinal direction of the bar was 100 mm, and the width of the blade was 1600 mm. The side surfaces of the concave portion of the lower shearing blade 25 both were perpendicular to the bar. The upper shearing blade was pressed into the bar by an amount equal to 1.2 times the thickness of the bar, that is, 36 mm, at a pressing speed of 300 mm/s, so as to cause parts of the preceding and following bars to be subjected to plastic flow and to bond the bars. At this time, a part of the lower bar in alignment with a part of the upper shearing blade finally contacting the bar was caused to bite into the material support lower shearing blade by about 5 mm. Next, a craw was pressed in the crops to separate them, whereby the bonding was completed. The bonded bar was then sent to the finish rolling mill and rolled. As a result, a continuous rolling was performed without any break occurring in the bonding portion of the bar. Each step of the above process is shown in FIGS. 19(a) to 19(h), respectively. In this embodiment, the time required from the step of partial descaling in FIG. 19(a) to the step of crop separation in FIG. 19(g) is 5 sec. A bonding test of a simulated bar was conducted up to the step of crop separation in FIG. 19(g), and then a test piece was made from the bonded portion of the simulated bar and a tensile strength test was conducted on the test piece. As a result, the same tensile strength as indicated in the embodiment 1 was attained.

Embodiment 7

Using the bonding apparatus of the embodiment 6, a bonding experiment was conducted by adjusting the amounts of overlap between the upper shearing blade and the bonding surface side lower shearing blade and the material support lower shearing blade to 1.5 mm and 0 mm; 0 mm and 0 mm; 0.5 mm and 0 mm; and 5 mm and 0 mm, respectively. In each of these cases, an excellent bonding strength was attained. While the amount of overlap between the upper shearing blade and the bonding surface side lower shearing blade was fixed to 3 mm, the amount of overlap between the upper shearing blade and the material support lower shearing blade is changed to −3 mm, −1.5 mm, and 1.5 mm, whereby a bonding experiment was conducted. In each of these cases, an excellent bonding strength was attained.

Further, the amounts of overlap between the upper shearing blade and the bonding surface side lower shearing blade and the material support lower shearing blade was set to 3 mm and 0 mm, respectively, and the pressing in speed of the upper shearing blade was changed to 5 mm/s, 10 mm/s, 50 mm/s, 100 mm/s, and 500 mm/s, whereby a bonding experiment was conducted. As a result, it was found that the faster the pressing in speed becomes, the larger the bonding strength becomes.

Further, under the same conditions as in the embodiment 6, the lower shearing blade was pressed in upwards by 36 mm, whereby a bonding experiment was conducted. The same bonding strength as in the embodiment 6 was attained.

Embodiment 8

Figure 20:
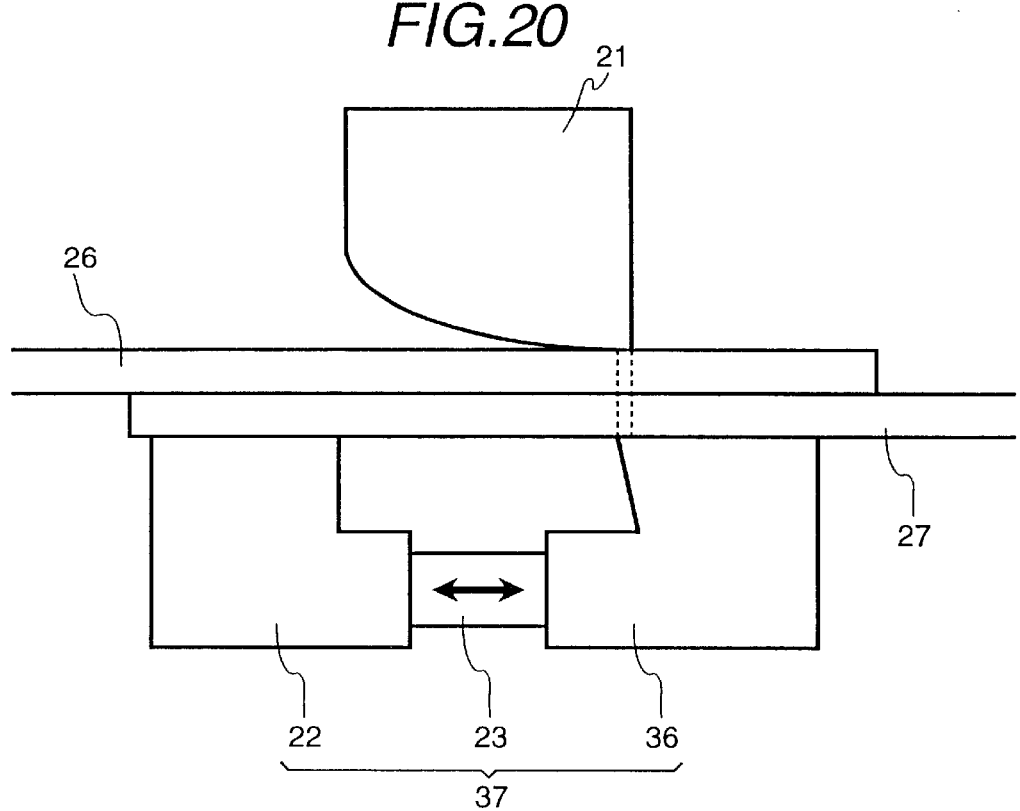
FIG. 20 is a view, taken from a lateral direction of a sheet bar, of an example of a bonding apparatus of the present invention.

A lower shearing blade 37 was constructed similar to the lower blade 25 of the bonding apparatus of the embodiment 6, except for the shape of the bonding surface side lower shearing blade 36. The shearing blade 36 has a shape inclined to the upper shearing blade side, as shown in FIG. 20. The inclination angle is 5° against a perpendicular direction. Using this bonding apparatus, a bonding experiment using a soft steel simulated bar of 30t was conducted. The amount of overlap, the pressing in stroke, and the pressing speed were the same as in the embodiment 6. The strength of the bonding portion was 350 MPa, and a higher strength was attained than in the embodiment 6. Further, a bonding experiment was conducted, changing the angle of the bonding surface side lower shearing blade to 10°, 15° and 20°. As a result, it was found that the bonding strength tends to increase as the angle increases.

Embodiment 9

Figure 21:
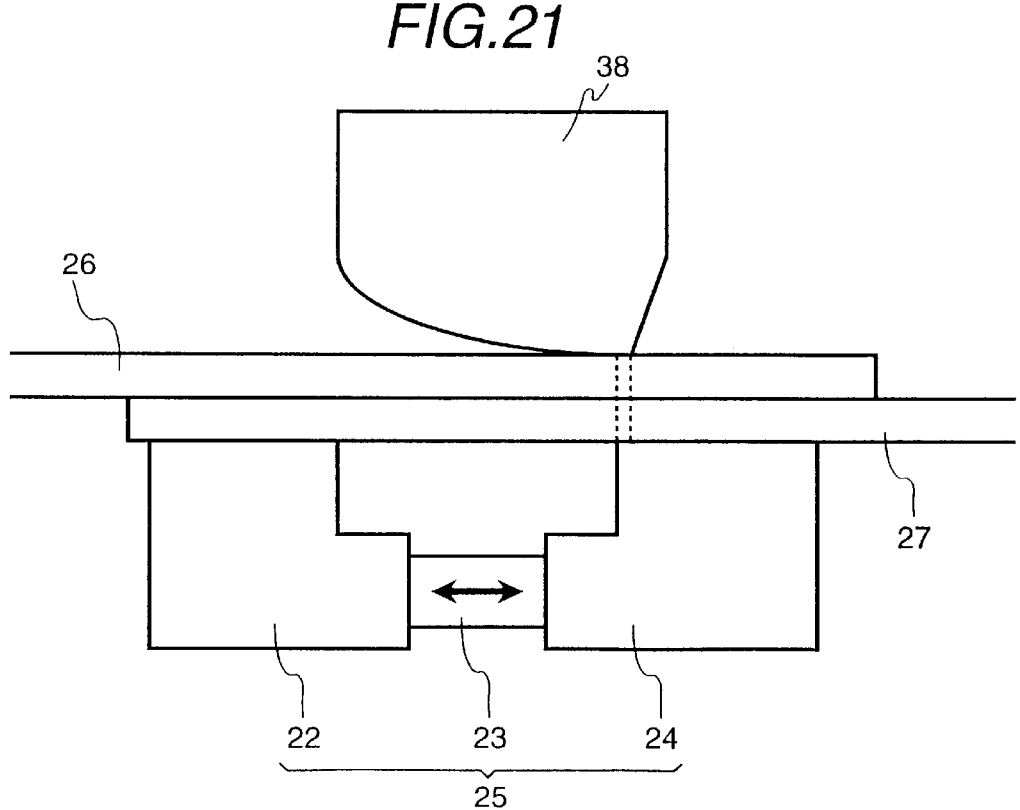
FIG. 21 is a view, taken from a lateral direction of a sheet bar, of an example of a bonding apparatus of the present invention.

The bonding apparatus of this embodiment is the same as that of the embodiment 6 except for the fact that the upper shearing blade 38 has a shape inclined toward the side of the bonding surface lower shearing blade 24, as shown in FIG. 21. The inclination angle is 15° with respect to the perpendicular direction. Using the bonding apparatus, a bonding experiment using a soft steel simulated bar of 30t was conducted. The amount of overlap, pressing in stroke, and the pressing speed were the same as in the embodiment 6. The strength of the bonding portion was higher than in the embodiment 6.

Embodiment 10

Figure 22:
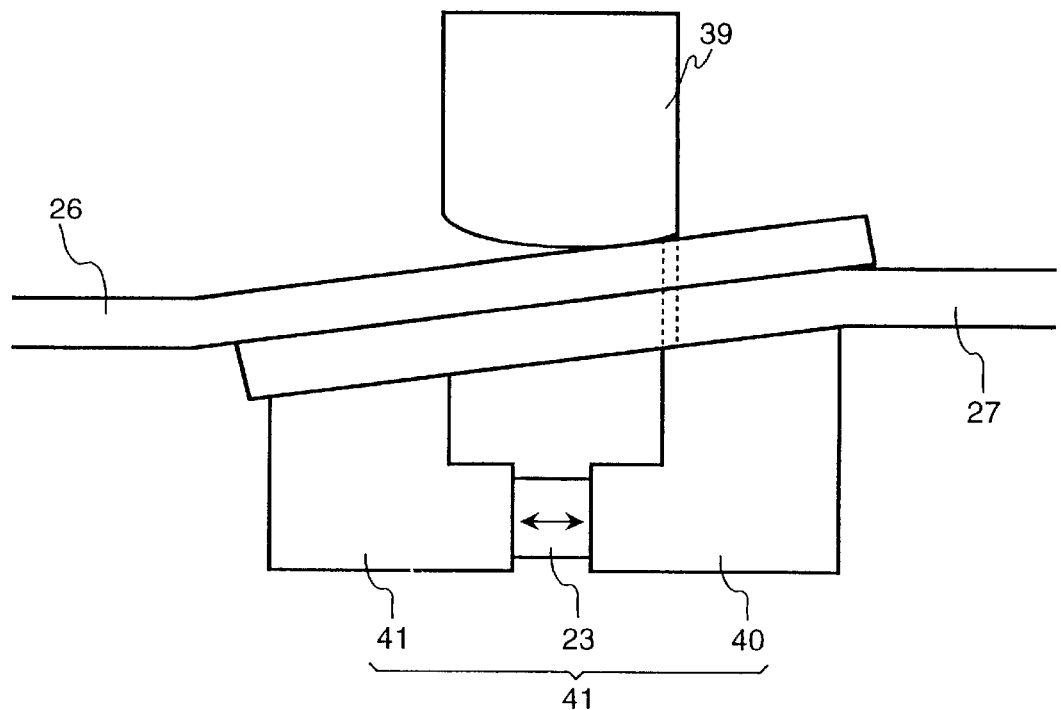
FIG. 22 is a view, taken from a lateral direction of a sheet bar, of an example of a bonding apparatus of the present invention.

The lower shearing blade 41 in this embodiment is the same as the lower shearing blade of the bonding apparatus of the embodiment 6, except for the fact that it has a shape in which the faces of the lower blades contacting the sheet bar 27 are inclined with respect to the running direction of the bar. The angle with respect to the running direction was 15°. An upper shearing blade 39 also was shaped such that a crossing point of the lower surface and a line from a crossing point of an upper surface and a front side in a perpendicular direction and inclined 15° against the front side is a starting point of an arc, as shown in FIG. 22, and a tangential line at the arc starting point is parallel to the sheet bar. Using the bonding apparatus, a bonding experiment using a soft steel simulated bar of 30t was conducted, wherein the amount of overlap, the pressing in stroke and the pressing speed were 0 mm, 38 mm and 300 mm/s, respectively. The strength of the bonding portion was sufficient for rolling.

Embodiment 11

Figure 23:
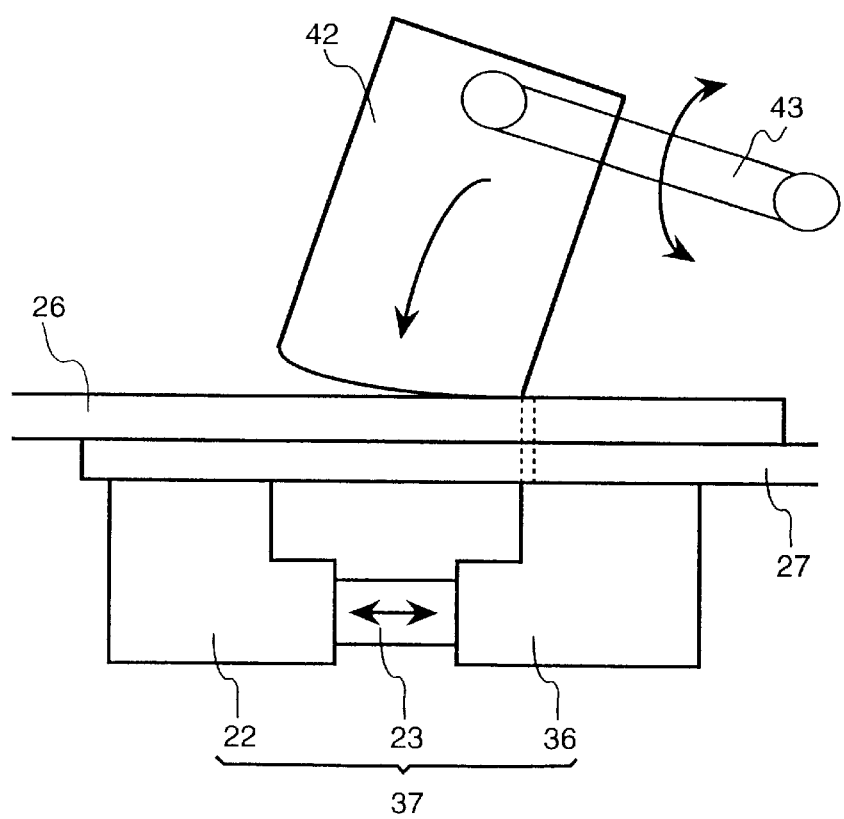
FIG. 23 is a view, taken from a lateral direction of a sheet bar, of an example of a bonding apparatus of the present invention.

The upper shearing blade 42 is different from the upper shearing blade 21 of the bonding apparatus of the embodiment 6 in that the shearing blade 42 is fixed to an end of an arm 43 and swung around another end of the arm 43 so as to press against the overlapping portion of the sheet bars 26, 27, as shown in FIG. 23. A lower shearing blade 37 is the same as that of the embodiment 6. Using this bonding apparatus, a bonding experiment using a soft steel simulated bar of 30t was conducted. The amount of overlap, the pressing in stroke, and the pressing speed are the same as in the embodiment 6. The same bonding strength as in the embodiment 6 was attained.

Embodiment 12

Figure 24:
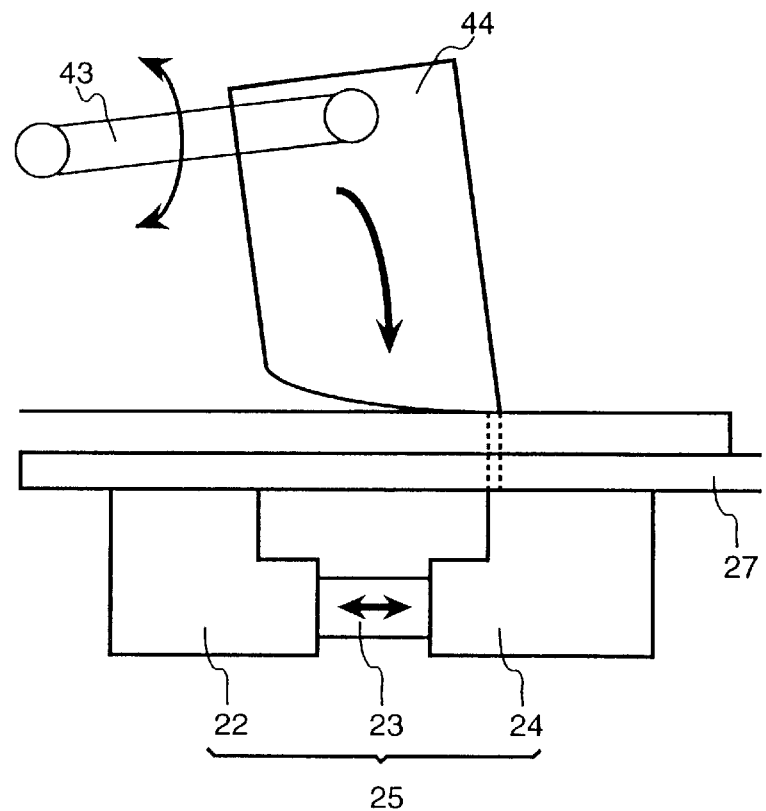
FIG. 24 is a view, taken from a lateral direction of a sheet bar, of an example of a bonding apparatus of the present invention.

An upper shearing blade 44 is fixed to the arm 43 which is swingable about an end thereof, as shown in FIG. 24. The other aspects of the construction are the same as the bonding apparatus of the embodiment 6. Using this bonding apparatus, a bonding experiment using a soft steel simulated bar of 30t was conducted. The amount of overlap, the pressing in stroke, and the pressing speed are the same as in the embodiment 6. The same bonding strength as in the embodiment 6 was attained.

Embodiment 13

Figure 25:
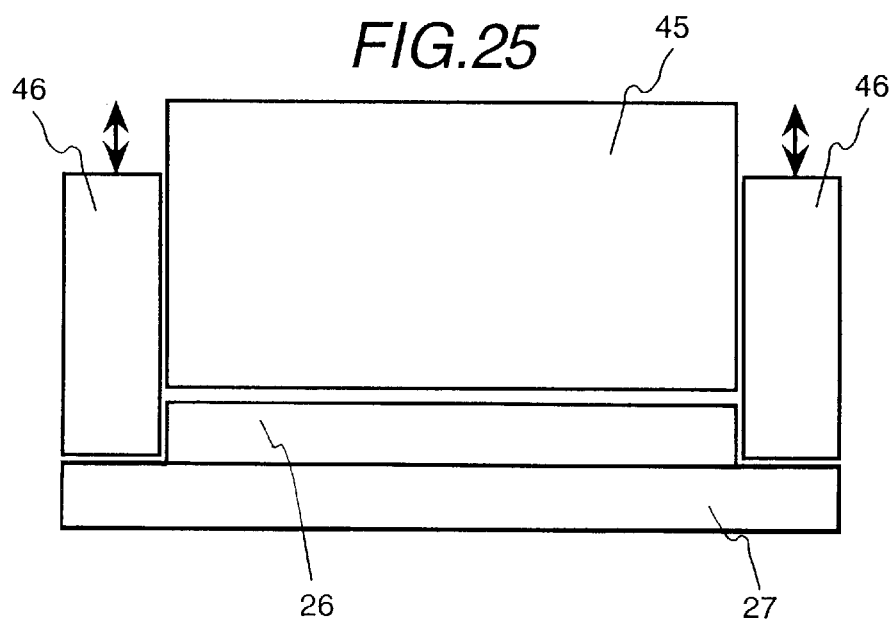
FIG. 25 is a view, taken from a lateral direction of a sheet bar, of an example of a bonding apparatus of the present invention.

In contrast to the bonding apparatus of the embodiment 6, in this embodiment, the upper shearing blade was divided into three parts 45, 46, 46, and was provided with a mechanism which caused the shearing blades 46 at both ends to project downwards further than the shearing blade 45 at the center, as shown in FIG. 25. The width of each of the shearing blades 46 at the ends was 400 mm, and the width of the central shearing blade 45 was 1400 mm. Using the bonding apparatus, a plate of 1400 mm width and a plate of 1500 mm width were bonded. The thickness of each plate was 30 mm. The height of the projection was adjusted to 30 mm in advance, the pressing stroke of each of the three shearing blades 45, 46 was 30 mm. A sufficient bonding strength was attained. Crop could be easily separated in the same manner as in the embodiment 6.

Embodiment 14

Using the bonding apparatus of the embodiment 6, a sheet bar of 20 mm thickness and a sheet bar of 30 mm thickness were bonded. The width of each sheet bar was 1500 mm. The amount of overlap was the same as in the embodiment 6. The pressing stroke was set to 36 mm, that is, it was 1.2 times the thickness of the thicker sheet bar. The same bonding strength as in the embodiment 6 was attained.

Embodiment 15

Figure 26:
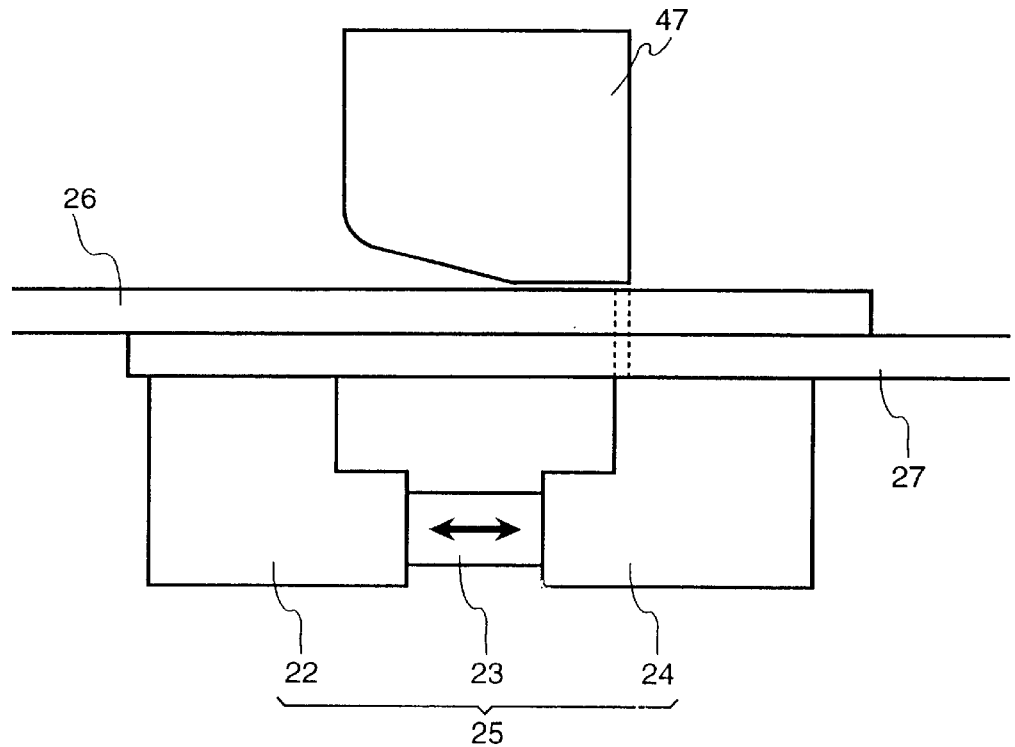
FIG. 26 is a view, taken from a lateral direction of a sheet bar, of an example of a bonding apparatus of the present invention.

An upper shearing blade 47 was made by forming an upper shearing blade as in the bonding apparatus of the embodiment 6 into such a shape wherein ⅓ of the blade in the sheet bar longitudinal direction was in parallel with the sheet bar, the following part was a straight line inclined 10° with respect to the sheet bar and a final contact portion was a partial arc of R30, as shown in FIG. 26. Using this bonding apparatus, a bonding experiment using a soft steel simulated bar of 30t was conducted. The amount of overlap, the pressing in stroke, and the pressing speed were the same as in the embodiment 6. The bonding strength was higher than in the embodiment 6.

Embodiment 16

Figure 27:
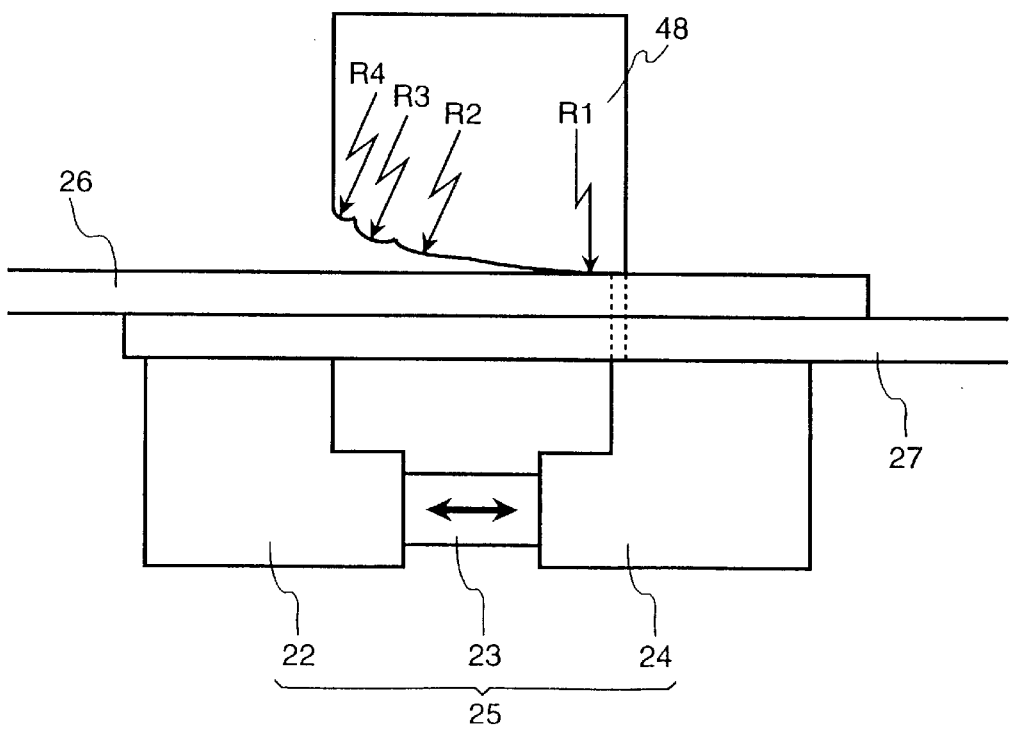
FIG. 27 is a view, taken from a lateral direction of a sheet bar, of an example of a bonding apparatus of the present invention.

An upper shearing blade 48 was formed for in the bonding apparatus of the embodiment 6 into a multi-arc shape including multiple arcs extending in a sheet bar longitudinal direction, as shown in FIG. 27. In FIG. 27, the radius R1 is 360 mm, R2 is 120 mm, R3 is 80 mm and R4 is 30 mm, and the surface is made so as to be in a smoothly changing curve. Using this bonding apparatus, a bonding experiment using a soft steel simulated bar of 30t was conducted. The amount of overlap, the pressing in stroke, and the pressing speed were the same as in the embodiment 6. The bonding strength was higher than in the embodiment 6.

Embodiment 17

Figure 28:
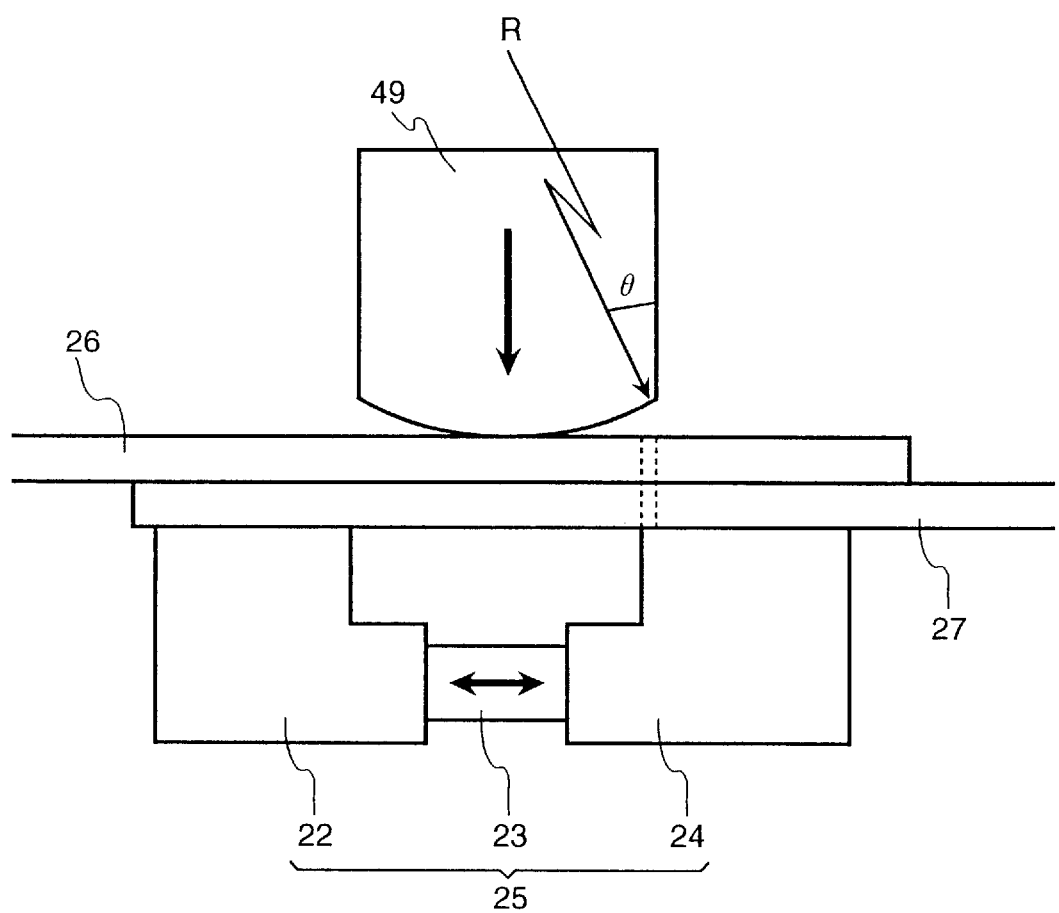
FIG. 28 is a view, taken from a lateral direction of a sheet bar, of an example of a bonding apparatus of the present invention.

An upper shearing blade 49 was formed for the bonding apparatus of the embodiment 6 into a shape in which the portion which initially contacts the sheet bar is shifted a little toward the backward side from the bonding portion, as shown in FIG. 28. The lower side of the upper shearing blade is arcuate and its radius is 240 mm. The arc starts at $\Theta=10°$ against the perpendicular front side thereof, as shown in FIG. 28. Using this bonding apparatus, a bonding experiment using a soft steel simulated bar of 30t was conducted. The pressing in stroke was 40 mm, and the other bonding conditions were the same as in the embodiment 6. The bonding strength was as high as that in the embodiment 6.

Embodiment 18

Figure 29A:
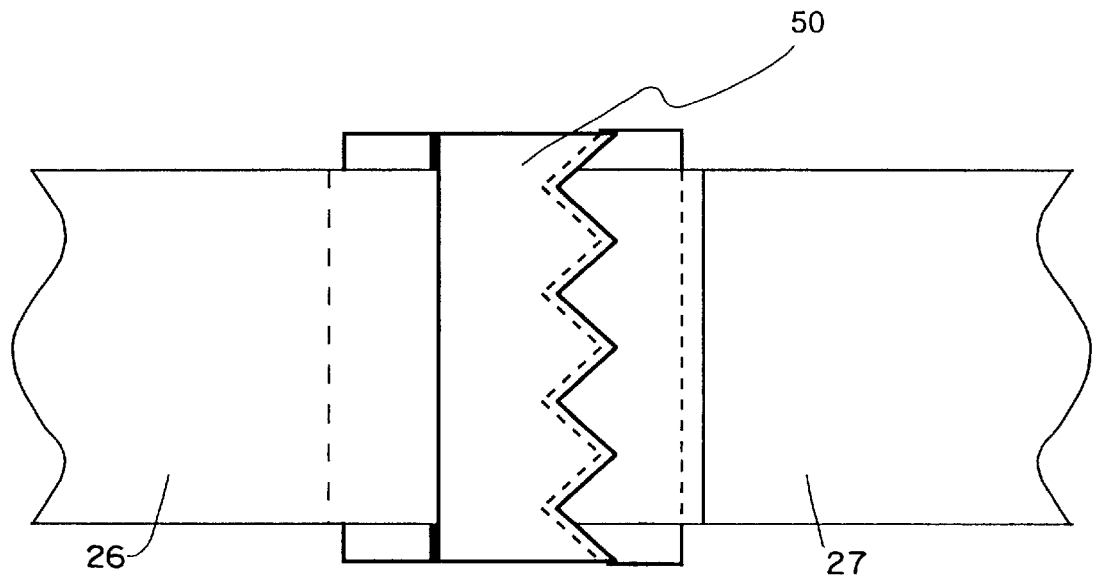
FIG. 29(a) is a view, taken from an upper direction of a sheet bar.
Figure 29B:
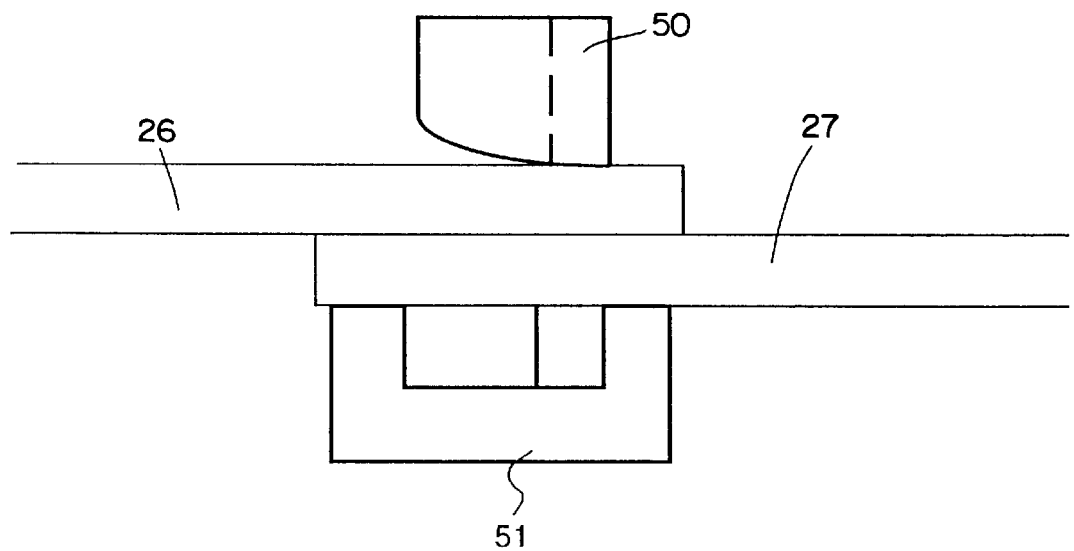
FIG. 29(b) is a side view of an example of a bonding apparatus of the present invention.

An upper shearing blade 50 was formed for the bonding apparatus of the embodiment 6 into a wave-form shape formed in triangles when viewed from the upper side of the sheet bar, as shown in FIG. 29(a). The shape of the upper shearing blade viewed from the side of the sheet bar, as seen in FIG. 29(b), is formed by a straight line in parallel with the bar extending into an arc-line, which straight line represents a portion corresponding to the wave-formed portion and the arc-line the other portion. The shape of the lower shearing blade 51, when viewed from the upper side of the bar, is a wave-form which is the same as the shape of the upper shearing blade. Using this bonding apparatus, a bonding experiment using a soft steel simulated bar of 30t was conducted. The amount of overlap, the pressing in stroke, and the pressing speed were the same as in the embodiment 6. The bonding strength was higher than in the embodiment 6.

Embodiment 19

Figure 30A:
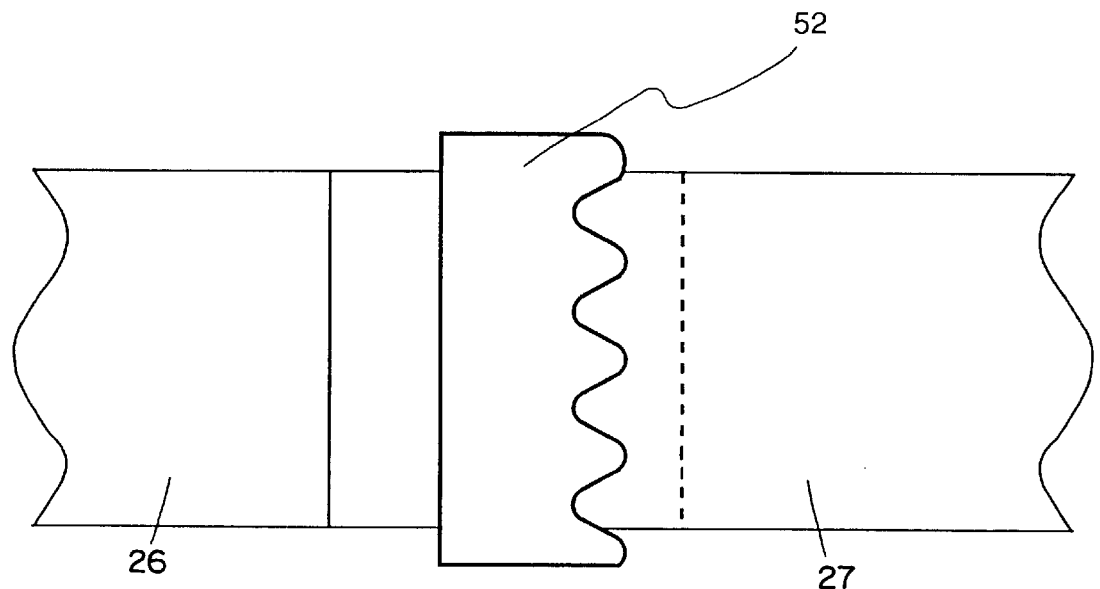
FIG. 30(a) is a view taken from an upper direction of a sheet bar.
Figure 30B:
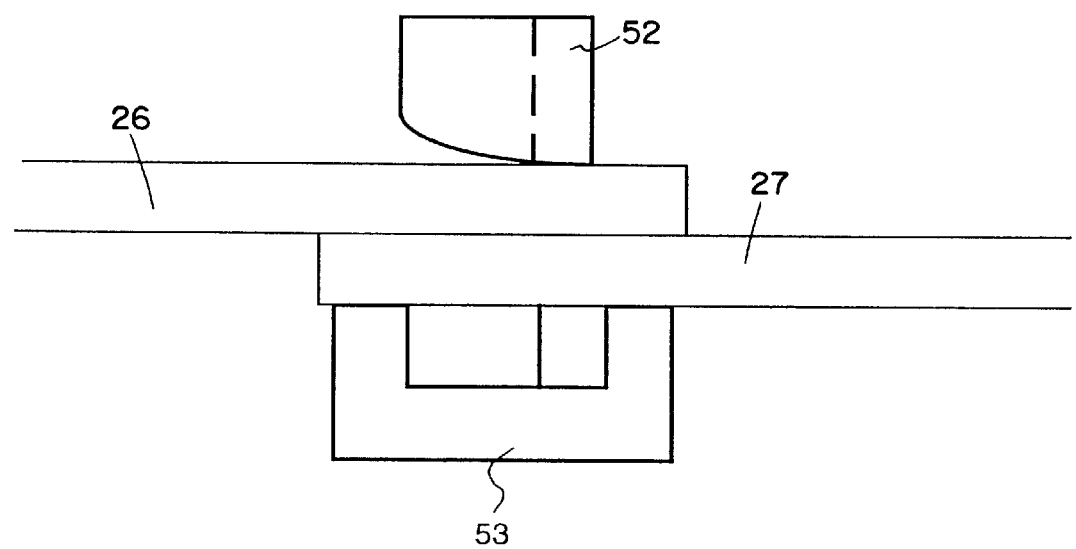
FIG. 30(b) is a side view of an example of a bonding apparatus of the present invention.

The shape of the upper shearing blade of the bonding apparatus of the embodiment 6 was made into a wave-form shape formed in a curved shape or rectangular shape when viewed from the upper side of the sheet bar, as shown in FIGS. 30(a), 31(a), whereby an upper shearing blade 52 or 54 was formed. The shape of the upper shearing blade when viewed from the side of the sheet bar, as seen in FIGS. 30(b), 31(b), is such that a portion corresponding to the wave form is a straight line in parallel with the bar extending into an arc-line, and the other portion is an arc-line. The shape of the lower shearing blade 53, 55, viewed from the upper side of the bar is the same as the shape of the upper shearing blade. Using this bonding apparatus, a bonding experiment using a soft steel simulated bar of 30t was conducted. The amount of overlap, the pressing in stroke, and the pressing speed were the same as in the embodiment 1. The bonding strength was higher than in the embodiment 1.

Embodiment 20

The shape of the upper shearing blade of the bonding apparatus of the embodiment 6 was made into a V-letter shape having both ends projecting toward the forward side when viewed from upper side of the sheet bar, as shown in FIG. 32(a), whereby an upper shearing blade 56 was formed. The shape of the upper shearing blade 56 viewed from the side of the sheet bar, as seen in FIG. 32(b), is such that the portion corresponding to the bottom of the V-letter shape is a straight line in parallel with the bar and extending into an arc-line, and the following portion is an arc-line. The shape of the lower shearing blade 57 corresponds to the shape of the upper shearing blade. Using this bonding apparatus, the same sheet bars as in the embodiment 6 were bonded under the same bonding conditions as in the embodiment 6, and then finish rolling was effected. As a result, end cracks appearing after the rolling were smaller than in the embodiment 6.

Embodiment 21

Figure 33A:
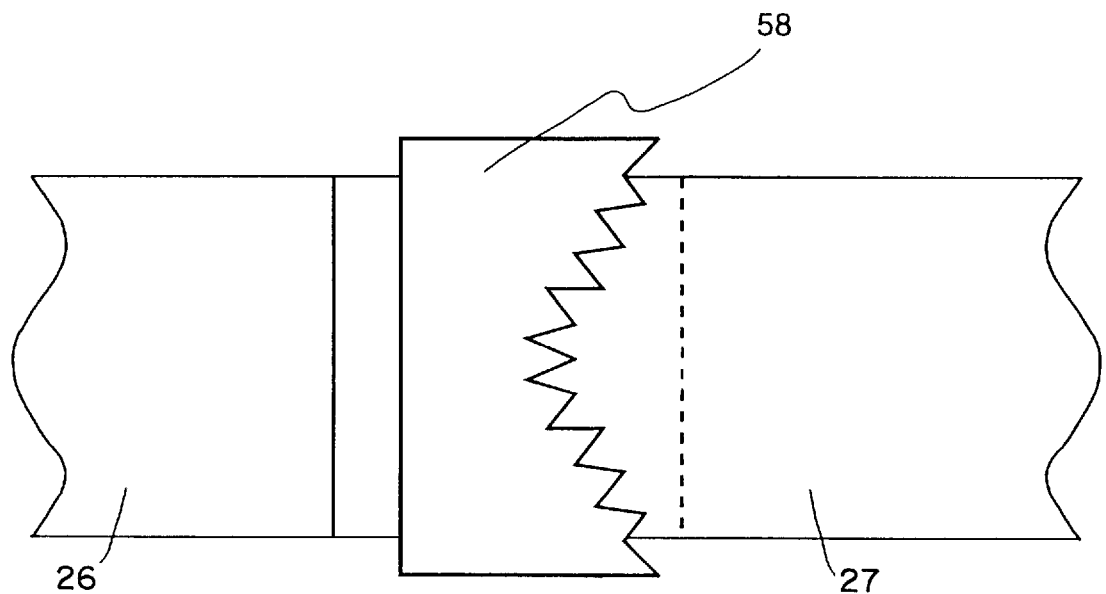
FIG. 33(a) is a view, taken from an upper direction of a sheet bar.
Figure 33B:
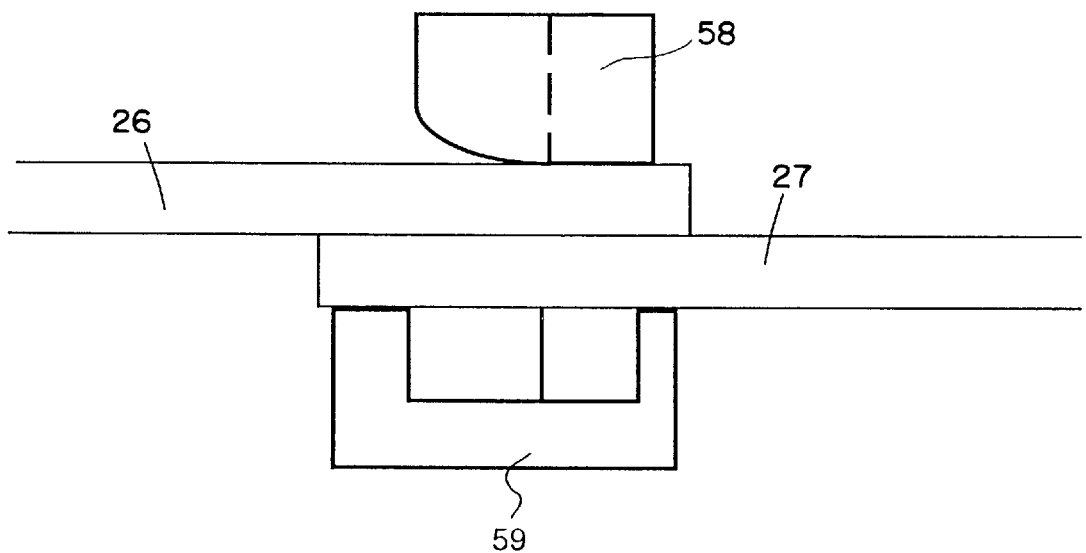
FIG. 33(b) is a side view of an example of a bonding apparatus of the present invention.

An upper shearing blade 58, similar to the upper shearing blade of the bonding apparatus of the embodiment 6, was formed, when viewed from the upper side of the sheet bar, to have an arcuate saw-tooth shape with both lateral ends projecting toward the downstream direction of the moving plate, as shown in FIG. 33(a). The shape of the upper shearing blade 58, viewed from a side of the sheet bar, as seen in FIG. 33(b), is such that the portion corresponding to a bottom portion of the arcuate saw-tooth shape is a straight line in parallel with the bar and extending into an arc-line, and the following portion is an arc-line. The shape of the lower shearing blade 59 corresponds to the shape of the upper shearing blade. Using this bonding apparatus, the same sheet bars as in the embodiment 6 were bonded under the same bonding conditions as in the embodiment 6, and then finish rolling was effected. As a result, a bonding strength higher than in the embodiment 6 was attained and almost no end cracks appeared after the rolling.

Embodiment 22

Figure 3:
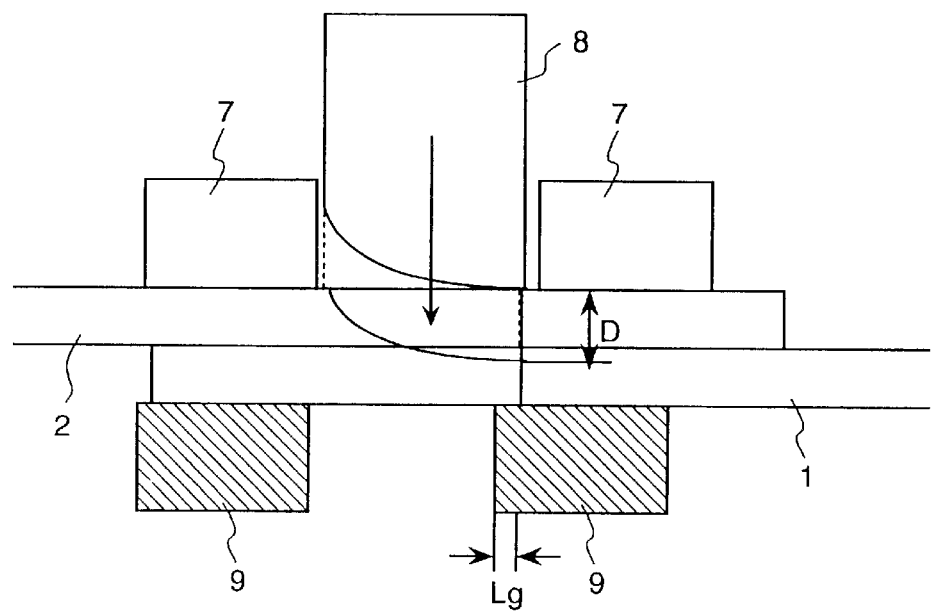
FIG. 3 is a side view showing the positional relationship of upper and lower shearing blades in a case in which the upper shearing blade is pushed.

The bonding apparatus according to this embodiment is of the type wherein both the shearing blade 8 (upper shearing blade) and the supports 9 (lower shearing blade), as shown in FIG. 3, of the embodiment 1 are simultaneously moved toward the sheet bars to be bonded and the shearing blade 8 is pressed into an overlapping portion of the sheet bars. The shapes of the upper and lower shearing blades 8, 9, the pressing-speed, the pressing depth and amount of overlap are the same as in the embodiment 1. Here, the bonding apparatus is a fixed type, that is, the bonding apparatus itself does not move along with the movement of the sheet bars, and it is a pendulum type of apparatus wherein the upper and lower shearing blades 8, 9 move perpendicularly to the running sheet bars.

Namely, in this bonding apparatus, while the shearing blade 8 and the supports 9 are being moved in the running direction of the sheet bars by a speed synchronizing apparatus having a crank incorporated therein (while members 8, 9 are being moved in synchronism with the running speed of the sheet bars), at the same time the shearing blade 8 and the supports 9 are moved perpendicularly to the sheet bars to bond them. In this embodiment also, the same bonding strength of the bars as in the embodiment 1 was attained.

According to the first aspect of the present invention, sufficiently strong bonding of the metal plates is possible within a short time. In particular, it is possible to provide a bonding apparatus which is disposed between a hot strip mill and a finish rolling mill to compensate for the difference in rolling speed between the rolling mills and which is suitable for bonding sheet bars.

According to the second aspect of the present invention, the entire length of the rolling facility can be shortened because the time required for bonding is short. Also, a looper can be omitted. Since sufficient bonding strength can be attained, there is no problem of a bonded portion of bar being broken during rolling or the surfaces of the rolling rolls being scratched.

According to the third aspect of the present invention, it is possible to attain a strong bonding of metal plates.

What is claimed is:

1. A bonding apparatus for bonding metal plates, comprising:
    an overlapping mechanism for overlapping end portions of the metal plates to be bonded;
    at least two supports for supporting the overlapping portions of the metal plates at one side of the metal plates;
    a shearing blade disposed opposite said supports so as to sandwich the overlapping portions of the metal plates; and
    a moving mechanism for moving at least one of said shearing blade and said supports relative to the other so as to press the shearing blade into the overlapped portion of the metal plates positioned between said supports and said shearing blade.

2. A bonding apparatus according to claim 1, wherein an extension line of a relative operating locus of said shearing blade crosses one of said supports.

3. A bonding apparatus according to claim 2, wherein said shearing blade has such a shape that a lower edge portion closer to said support crossing said extension line of the relative operating locus of said shearing blade is closer to the overlapped portion of the metal plates than the lower edge portion closer to the other support.

4. A bonding apparatus according to claim 1, wherein said shearing blade moves relatively straight toward said supports, and there is a predetermined overlap between said shearing blade and one of said supports as seen in a direction parallel with a relative operating line of said shearing blade.

5. A bonding apparatus according to claim 4, wherein said predetermined overlap is 10 mm or less in a longitudinal direction of the metal plate.

6. A bonding apparatus according to claim 1, wherein an operation stroke of said at least one of said shearing blade and said supports from a contact position of said shearing blade with the surface of the overlapping metal plates is 50–150% of the thickness of a maximum thickness metal plate of the overlapping metal plates.

7. A bonding apparatus according to claim 1, further including a mechanism for moving said bonding apparatus on a rail.

8. A bonding apparatus according to claim 1, wherein said supports are connected to each other to shape a concave form.

9. A bonding apparatus according to claim 1, wherein the metal plates are hot rolling plates.

10. A bonding apparatus according to claim 1, wherein the sectional shape of said shearing blade, taken from a lateral side in the longitudinal direction of the metal plate is a polygon of trapezoidal shape, so that a contacting area of said shearing blade and the metal plate changes continuously, and wherein an angle of a portion of said shearing blade which first comes into contact with the metal plate is about 0° with respect to the longitudinal direction of the metal plate.

11. A bonding apparatus according to claim 1, wherein the sectional shape of said shearing blade, taken from a lateral side in the longitudinal direction of the metal plate, is different than the sectional shape in a width direction of the metal plate.

12. A bonding apparatus according to claim 1, wherein the sectional shape of said shearing blade, taken from an upper or lower side of the metal plate in the longitudinal direction, is formed in a wave-form shape defined by a straight or curved line.

13. A bonding apparatus according to claim 1, wherein the sectional shape of said shearing blade, taken from an upper or lower side of the metal plate in the longitudinal direction, is a V-shape with both width-wise ends of the V-shape protruding toward a forward side of the metal plate.

14. A bonding apparatus according to claim 8, wherein the distance in the longitudinal direction of the metal plates between support portions of said concave support is smaller toward a side of said shearing blade.

15. A bonding apparatus according to claim 1, wherein there is provided a mechanism for overlapping the metal plates after descaling of at least one portion of the portions of the metal plates to be overlapped.

16. A bonding apparatus according to claim 8, wherein the length between said supports forming said concave form in a longitudinal direction of the metal plate is shorter than the length of said shearing blade in the longitudinal direction of the metal plate.

17. A bonding apparatus according to claim 1, wherein there is provided a temperature adjustor for adjusting the temperature of the metal plates to be bonded before bonding.

18. A bonding apparatus according to claim 1, wherein a speed at which said at least one of said shearing blade and said supports is at least pressed in the metal plates is 5 mm/s.

19. A hot strip mill facility, comprising:

an intermediate coiler for coiling up a metal plate;

a leveler for flattening the metal plate from said intermediate coiler;

a bonding apparatus for overlapping ends of successive metal plates from said leveler and bonding the metal plates;

a crop treatment apparatus for separating crop produced during the bonding; and a finishing rolling mill; and wherein said bonding apparatus is a bonding apparatus according to claim 1.

a bonding apparatus for overlapping ends of successive metal plates from said leveler and bonding the metal plates;

a crop treatment apparatus for separating crop produced during the bonding; and a finishing rolling mill; and wherein said bonding apparatus is a bonding apparatus according to claim 1.

* * * * *